US011254809B2

(12) United States Patent
Liu et al.

(10) Patent No.: US 11,254,809 B2
(45) Date of Patent: Feb. 22, 2022

(54) POLYMER COMPOSITION AND A PROCESS FOR PRODUCTION OF THE POLYMER COMPOSITION

(71) Applicant: Borealis AG, Vienna (AT)

(72) Inventors: Yi Liu, Linz (AT); Qizheng Dou, Linz (AT)

(73) Assignee: Borealis AG, Vienna (AT)

( * ) Notice: Subject to any disclaimer, the term of this patent is extended or adjusted under 35 U.S.C. 154(b) by 149 days.

(21) Appl. No.: 16/497,511

(22) PCT Filed: Jun. 13, 2018

(86) PCT No.: PCT/EP2018/065587
§ 371 (c)(1),
(2) Date: Sep. 25, 2019

(87) PCT Pub. No.: WO2018/234110
PCT Pub. Date: Dec. 27, 2018

(65) Prior Publication Data
US 2020/0291210 A1   Sep. 17, 2020

(30) Foreign Application Priority Data

Jun. 21, 2017   (EP) .................................... 17177063

(51) Int. Cl.
C08L 23/16 (2006.01)
C08L 23/06 (2006.01)

(52) U.S. Cl.
CPC ............. *C08L 23/06* (2013.01); *C08L 23/16* (2013.01); *C08L 2203/18* (2013.01); *C08L 2205/03* (2013.01)

(58) Field of Classification Search
CPC .. C08L 23/06; C08L 2205/03; C08L 2203/18; C08L 23/08; C08L 23/0807; C08L 23/0815; C08L 23/16
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,532,311 A | 7/1985 | Fulks et al. | |
| 4,543,399 A | 9/1985 | Jenkins et al. | |
| 4,578,879 A | 4/1986 | Yokoyama et al. | |
| 4,582,816 A | 4/1986 | Miro | |
| 4,621,952 A | 11/1986 | Aronson | |
| 4,803,251 A | 2/1989 | Goode et al. | |
| 4,855,370 A | 8/1989 | Chirillo et al. | |
| 4,933,149 A | 6/1990 | Rhee et al. | |
| 5,026,795 A | 6/1991 | Hogan | |
| 5,391,654 A | 2/1995 | Ahvenainen | |
| 6,770,341 B1 | 8/2004 | Bohm et al. | |
| 9,234,061 B2 * | 1/2016 | Vahteri | C08J 5/18 |
| 9,527,934 B2 * | 12/2016 | Buryak | C09D 123/06 |
| 9,920,190 B2 * | 3/2018 | Liu | C08L 23/06 |
| 10,118,977 B2 * | 11/2018 | Sumerin | C08F 210/16 |
| 10,364,310 B2 * | 7/2019 | Sumerin | C08F 210/16 |
| 10,669,410 B2 * | 6/2020 | Liu | C08L 23/06 |
| 10,889,697 B2 * | 1/2021 | Tynys | C08F 210/16 |
| 10,961,334 B2 * | 3/2021 | Liu | C08L 23/0815 |
| 2017/0002187 A1 * | 1/2017 | Tynys | C08L 23/0815 |
| 2018/0037725 A1 * | 2/2018 | Tynys | C08L 23/06 |
| 2018/0282504 A1 * | 10/2018 | Tynys | C08J 3/203 |
| 2019/0256695 A1 * | 8/2019 | Liu | C08L 23/16 |
| 2019/0292283 A1 * | 9/2019 | Liu | C08F 4/65916 |
| 2020/0062883 A1 * | 2/2020 | Roos | C08L 23/04 |

FOREIGN PATENT DOCUMENTS

| | | |
|---|---|---|
| CN | 103304869 A | 9/2013 |
| EP | 47077 A1 | 3/1982 |
| EP | 188125 A2 | 12/1985 |
| EP | 250169 A2 | 12/1987 |
| EP | 372239 A2 | 6/1990 |
| EP | 376936 A2 | 7/1990 |

(Continued)

OTHER PUBLICATIONS

Cox, et al., "Understanding Rheology of Thermoplastic Polymers", TA Instruments, Journal of Polymer Science, 1958, 28, 118, 8 pages.
Opposition Writ against EP3418330 dated Sep. 3, 2020, 18 pages.
Huang et al. "The Effect of Molecular Weight on Slow Crack Growth in Linear Polyethylene Homopolymers", Journal of Materials Science, 1988, 23, 8 pages.
Wikipedia, "Melt Flow Index", https://en.wikipedia.org/wiki/Melt_Flow_Index, 3 pages, last edited date Apr. 20, 2020 and retrieved on Sep. 2, 2020.
Klimke, et al., "Optimization and Application of Polyolefin Branch Quantification by Melt-State 13C NMR Spectroscopy," Macromolecular Chemistry and Physics, vol. 207, 2006, pp. 382-395.
Geldart et al. "The Design of Distributors for Gas-Fluidized Beds" Powder Technology, vol. 42, 1985, pp. 67-78.
Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.

(Continued)

*Primary Examiner* — Rip A Lee
(74) *Attorney, Agent, or Firm* — Lowenstein Sandler LLP

(57) ABSTRACT

A polymer composition comprising a base resin is disclosed herein. The base resin includes a very high molecular weight polyethylene component, a low molecular weight polyethylene component having a weight average molecular weight lower than a weight average molecular weight of the very high molecular weight component and a high molecular weight component having a weight average molecular weight higher than the weight average molecular weight of the low molecular weight component, but lower than the weight average molecular weight of the very high molecular weight component. The composition has a complex viscosity at 0.05 rad/s $Eta_{0.05\ rad/s}$ of equal to or more than 800 kPa·s, a viscosity at a shear stress of 747 Pa (eta747) of equal to or less than 34000 kPas and a melt flow rate MFR5 of equal to or less than 0.17 g/10 min.

15 Claims, 2 Drawing Sheets

(56) References Cited

FOREIGN PATENT DOCUMENTS

| | | | |
|---|---|---|---|
| EP | 424049 A2 | 4/1991 | |
| EP | 479186 A2 | 4/1992 | |
| EP | 499759 A1 | 8/1992 | |
| EP | 560035 A1 | 9/1993 | |
| EP | 579426 A1 | 1/1994 | |
| EP | 600414 A1 | 6/1994 | |
| EP | 683176 A1 | 11/1995 | |
| EP | 721798 A2 | 7/1996 | |
| EP | 891990 A2 | 1/1999 | |
| EP | 1310295 A1 | 5/2003 | |
| EP | 1415999 A1 | 5/2004 | |
| EP | 1460105 A1 | 9/2004 | |
| EP | 1591460 A1 | 11/2005 | |
| EP | 1600276 A1 | 11/2005 | |
| EP | 1655334 A1 | 5/2006 | |
| EP | 2599828 * | 6/2013 | .............. C08L 23/06 |
| EP | 2799487 A1 | 11/2014 | |
| EP | 2860203 A1 | 4/2015 | |
| EP | 2966123 A1 | 1/2016 | |
| EP | 2831167 B1 | 12/2017 | |
| GB | 1272778 A | 5/1972 | |
| GB | 2498936 A | 8/2013 | |
| WO | 9221705 A1 | 12/1992 | |
| WO | 9311166 A1 | 6/1993 | |
| WO | 9425495 A1 | 11/1994 | |
| WO | 9425497 A1 | 11/1994 | |
| WO | 9428032 A1 | 12/1994 | |
| WO | 9428064 A1 | 12/1994 | |
| WO | 9501831 A1 | 1/1995 | |
| WO | 9517952 A1 | 7/1995 | |
| WO | 9618677 A1 | 6/1996 | |
| WO | 9619503 A1 | 6/1996 | |
| WO | 9632420 A1 | 10/1996 | |
| WO | 0022040 A1 | 4/2000 | |
| WO | 0026258 A1 | 5/2000 | |
| WO | 0029452 A1 | 5/2000 | |
| WO | 0105845 A1 | 1/2001 | |
| WO | 02088194 A1 | 11/2002 | |
| WO | 2005087361 A1 | 9/2005 | |
| WO | 2006092378 A1 | 9/2006 | |
| WO | 2007025640 A1 | 3/2007 | |
| WO | 2007042216 A1 | 4/2007 | |
| WO | WO 2013/144328 A1 * | 10/2013 | .............. C08L 23/04 |
| WO | 2016097193 A1 | 6/2016 | |
| WO | 2016/206768 A1 | 12/2016 | |
| WO | WO 2018/095772 A3 * | 5/2018 | .............. C08L 23/04 |

OTHER PUBLICATIONS

Filip, et al., "Heteronuclear decoupling under fast MAS by a rotor-synchronized Hahn-echo pulse train," Journal of Magnetic Resonance, vol. 176, 2005, pp. 239-243.

Griffin, et al., "Low-load Rotor-Synchronised Hahn-echo Pulso Train (RS-HEPT) 1H Decoupling in Solid-State NMR: factors affecting MAS Spin-echo Dephasing Times",. Magnetic Resonance in Chemistry, 2007; 45: S198-S208, Published online in Wiley Interscience.

Castignolles, et al., "Detection and quantification of branching in polyacrylates by size-exclusion chromatography (SEC) and melt-state 13C NMR spectroscopy," Polymer, vol. 50, 2008, pp. 2373-2383.

Randall, et al., "A Review of High Resolution Liquid 13Carbon Nuclear Magnet Resonance Characterizations of Ethylene-Based Polymers", Rev. Macromol. Chem. Phys. 1989, C29, 201-317.

Encyclopedia of Polymer Science and Technology, 2nd Ed., vol. 14, pp. 492-509 (1972).

Huang et al. "Slow Crack growth in blends of HDPE and UHMWPE" Department of Materials Science and Engineering, University of Pennsylvania, Polymer, 1992 vol. 33, No. 14, pp. 2989-2997

Geldart, "Gas-Fluidization Technology", vol. 42, 1986, 24 pages.

Kyu et al. Cocrystallization and Miscibility Studies of Blends of Ultrahigh Molecular Weight Polyethylene with Conventional Polyethylene, Journal of Applied Polymer Science, vol. 32, 5575-5584 (1986).

Lim et al. "High-Density Polyethylene/Ultrahigh-Molecular-Weight Polyethylene Blend. I. the Processing, Thermal, and Mechanical Properties," Journal of Applied Polymer Science, vol. 97, pp. 413-425 (2005).

Jarkinson, et al., "Effect of Branch Length on 13C NMR Relaxation Properties in Moten Poly[ethylene-co-(x-olefin)] Model Systems," Macromolecular Chemistry and Physics, vol. 208, 2007, pp. 2128-2133.

International Search Report for PCT PCT/EP2018/065587 dated Jul. 18, 2018, 13 pages.

Huang et al. "Slow Crack growth in blends of HDPE and UHMWPE" Department of Materials Science and Engineering, University of Pennsylvania, Polymer, 1992 vol. 33, No. 14, pp. 2989-2997.

* cited by examiner

POLYMER COMPOSITION AND A PROCESS FOR PRODUCTION OF THE POLYMER COMPOSITION

CROSS-REFERENCE TO RELATED APPLICATION(S)

This application is a national phase of International Application No. PCT/EP2018/065587, filed on Jun. 13, 2018, which claims the benefit of European Patent Application No. 17177063.9, filed on Jun. 21, 2017. The contents of these applications are hereby incorporated by reference in their entirety.

BACKGROUND OF THE INVENTION

This disclosure relates generally to a polymer composition and a process for production of the polymer composition. Especially, the disclosure relates to a multimodal ethylene composition comprising at least three polymer components, which are a very high molecular weight polyethylene component, a low molecular weight polyethylene component having a weight average molecular weight lower than a weight average molecular weight of the very high molecular weight polyethylene component and a high molecular weight polyethylene component having a weight average molecular weight higher than the weight average molecular weight of the low molecular weight polyethylene component, but lower than the weight average molecular weight of the very high molecular weight component. Also the disclosure relates to an article, such as a pipe or fitting, made of the polymer composition and a use of the polymer composition for the production of the article.

Numerous polyethylene compositions for the production of pipes are known. Pipe materials are classified such as PE80 or PE100. The service temperature for PE100 is 20° C. The ISO 9080 classification guarantees that a PE100 material will have a lifetime of at least 50 years at 20° C. using internal stress of 10 MPa.

The high molecular weight (HMW) component provides improved mechanical properties to the composition. The high molecular weight component's density may be lower than 940 kg/m$^3$. When increasing the molecular weight of the component mechanical properties of the composition can be improved. Instead the low molecular weight (LMW) component provides good processability. The density of the low molecular weight component is typically greater than 940 kg/m$^3$. Mixing high molecular weight components together with low molecular weight components may result in a loss of homogeneity, because the viscosity ratio between the high molecular weight components and the low molecular weight components is increasing. The loss of homogeneity may be detrimental to the mechanical properties of the articles.

It is well-known to add the ultra-high molecular weight (UHMW) component into the composition of the low and high molecular weight components to further improve the mechanical properties. Typically viscosity average molecular weight of ultra-high molecular weight polyethylene is greater than 3 million. The density of the ultra-high molecular weight polyethylene may be less than 935 kg/m$^3$. However, there are serious compatibility problems due to the ultra-high molecular weight component. For example, Ogunniyi et al (Journal of Applied Polymer Science, 2005, 97, 413-425) and Vadhar et al (Journal of Applied Polymer Science, 1986, 32, 5575-5584) both report the need for long blending times of the order of 15 minutes in a batch mixer when the ultra-high molecular weight polyethylene was added to other polyethylenes.

The incorporation of UHMW polyethylene into a polyethylene composition as a copolymer is also known and is reported in, for example, WO 2007/042216, WO 96/18677 and WO 2006/092378.

The inclusion of UHMW polyethylene into HDPE via extrusion has also been investigated and has been carried out using a co-rotating twin screw extruder by Huang and Brown (Polymer, 1992, 33, 2989-2997). However, although the UHMW polyethylene particles were found to be well bonded in the matrix and this helped to slow down the rate of crack propagation, when analysed under SEM, the UHMW polyethylene was found to remain in large separate domains with no evidence of "melting" into the HDPE matrix. For these reasons, the amount of UHMW polyethylene is limited to low loadings.

In WO 94/28064, polyethylene compositions are reported comprising a UHMW component and unimodal HDPE component.

Multimodal polymers can be used to manufacture articles having various features depending on e.g. an application and circumstances. Articles can be for instance films, fibres, cable sheathings, pipes and fittings. Pipes made from polymer compositions have many purposes of use, such as to transport liquids or gas. Typically pipes must be able to withstand pressure, because liquids or gas usually are pressurised. Polymer compositions comprising polyethylenes are nowadays frequently used for manufacturing pipes. Such polymer compositions may comprise e.g. two or more polyethylene fractions with different weight average molecular weights, frequently called multimodal and they have good chemical and physical properties. Fractions may contain ethylene homo- or copolymers. The content of comonomer can be varied as well as the type of the comonomer, which usually is alpha-olefin comonomer. The composition of each of the fractions as well as the relative proportions between fractions has significant influence on the properties of the multimodal composition. Furthermore, the polymerisation conditions, e.g. reactor types, reactant concentrations and the type of the polymerisation catalyst have a remarkable influence on properties of fractions.

EP 2799487 discloses a polyethylene composition comprising a high density multimodal polyethylene component and an ultra-high molecular weight polyethylene copolymer, which may be unimodal. The multimodal polyethylene composition may comprise a lower weight average molecular weight ethylene homopolymer or copolymer component, and a higher weight average molecular weight ethylene homopolymer or copolymer component. This blend may further comprise an ultra-high molecular weight polyethylene homopolymer component also being unimodal. A preparation made from this blend has good impact properties and the blend also has excellent processability. However, since the major examples were prepared by melt blending a bimodal PE with UHMWPE, fine adjustments of each component, i.e., the LMW, HMW and UHMWPE fractions, were not explored. Also, for the examples showing improved SCG (either acc. FNCT or CRB data), considerable reduction of density was reported in comparison to the original bimodal PE. This may negatively influence the short-term pressure resistance.

GB 2498936 discloses a polyethylene having a multimodal molecular weight distribution comprising a lower molecular weight ethylene polymer, a first higher molecular weight ethylene copolymer and a second higher molecular weight ethylene copolymer. These three components are polymerised in three reactors. The object is to manufacture pipes from this polyethylene to improve a slow crack growth resistance without deleterious effect on other desired properties like a rapid crack propagation, hardness, abrasion resistance and processability. However, it did not report the properties of pipes made of the claimed materials and the disclosed impact strength is not high. The composition has according to an inventive example a complex viscosity at 0.05 rad/s $Eta_{0.05\ rad/s}$ of 96.179 Pa·s, which may suggest that SCG resistance and strain hardening modulus are rather modest.

CN 103304869 discloses a multimodal polyethylene pipe resin composition comprising an ethylene homopolymer component A, an ethylene copolymer component B having an average molecular weight greater than that of the component A, and an ethylene copolymer component C having an average molecular weight greater than that of the component B. The resin was prepared in three slurry reactors in series. According to examples of the polyethylene composition density varies from 942 to 960 kg/m$^3$ and MFR5 varies from 0.19 to 1.86 g/10 min. Pipes prepared from this composition have e.g. good pressure resistance. However, it remains silent about other crucial properties of pipes made thereof, e.g., SCG resistance.

A pressure resistance is an important feature of pipes but the requirement for the pressure resistance depends on its end use. According to ISO 9080 polyethylene pipes are classified by their minimum required strength, i.e. their capability to withstand different hoop stresses during 50 years at 20° C. without fracturing. Thereby, pipes withstanding a hoop stress of 8.0 MPa (MRS8.0) are classified as PE80 pipes, and pipes withstanding a hoop stress of 10.0 MPa (MRS10.0) are classified as PE100 pipes. Thus the hydrostatic pressure resistance of PE 125 resin is better than PE 100 resin. PE125 pipes withstand a hoop stress of 12.5 MPa (MRS12.5 for 50 years at 20° C. without fracturing). To meet the PE80 requirements with multimodal resins manufactured by conventional Ziegler-Natta catalysts, the density needs to be at least 940 kg/m$^3$ and to meet PE100 requirements the density needs to be above 945 kg/m$^3$. Typically when a density of polymer material is increasing the pressure resistance is increasing. However, the density of a polyethylene resin is directly connected with its crystallinity. The higher the crystallinity of a polyethylene resin the lower its slow crack growth resistance. In other words, all polyethylene materials for pressure resistance of a pipe suffer from the dependency of crystallinity and insofar density and the slow crack growth. When the density is increased, the resistance to slow crack growth (SCG) decreases. The required pressure resistance for PE 125 appears to be unachievable for a feasible stiffness/density of high density polyethylene.

U.S. Pat. No. 6,770,341 and EP 1 460 105 disclose bimodal polyethylene compositions for the production of pipes meeting the PE125 requirements which due to the high density of the base resin show inferior slow crack growth resistance.

Hence, there is still a need for polyethylene compositions having a base resin with a high density, for the production of pipes which show improved mechanical performance, especially improved slow crack growth resistance.

It has now been found that a polyethylene composition comprising at least three polyethylene components having weight average molecular weights diverging from each other may have improved mechanical performance including slow crack growth resistance and hydrostatic pressure resistance.

BRIEF DESCRIPTION OF THE INVENTION

The deficiencies, drawbacks and problems mentioned above are addressed herein and can be understood by reading the detailed account.

In an embodiment of the present invention, a polymer composition comprising a base resin includes at least three polymer components, which are a very high molecular weight polyethylene component as fraction A1, a low molecular weight polyethylene component as fraction A2 having a weight average molecular weight lower than a weight average molecular weight of the very high molecular weight polyethylene component, and a high molecular weight polyethylene component as fraction A3 having a weight average molecular weight higher than the weight average molecular weight of the low molecular weight polyethylene component, but lower than the weight average molecular weight of the very high molecular weight component. The composition has a complex viscosity at 0.05 rad/s $Eta_{0.05\ rad/s}$ of equal to or more than 800 kPa·s, a viscosity at a shear stress of 747 Pa (eta747) of equal to or less than 34000 kPas and a melt flow rate MFR5 of equal to or less than 0.17 g/10 min.

In another embodiment of the present invention, a process for the production of a polymer composition comprising a base resin includes steps of polymerising ethylene and optionally at least one comonomer in the presence of a polymerisation catalyst to form a very high molecular weight polyethylene component of fraction A1, polymerising ethylene and optionally at least one comonomer in the presence of same or different polymerisation catalyst(s) as polymerising the very high molecular weight polyethylene component to form a low molecular weight polyethylene component of fraction A2 having a weight average molecular weight lower than a weight average molecular weight of the very high molecular weight polyethylene component, and polymerising ethylene and optionally at least one comonomer in the presence of same or different polymerisation catalyst(s) as polymerising the very high molecular weight polyethylene component to form a high molecular weight polyethylene component of fraction A3. A weight average molecular weight of fraction A3 is higher than the weight average molecular weight of the low molecular weight polyethylene component, but lower than the weight average molecular weight of the very high molecular weight component. At least one of the catalyst(s) is a Ziegler-Natta (ZN) catalyst. The composition has a complex viscosity at 0.05 rad/s $Eta_{0.05\ rad/s}$ of equal to or more than 800 kPa·s, a viscosity at a shear stress of 747 Pa (eta747) of equal to or less than 34000 kPas and a melt flow rate MFR5 of equal to or less than 0.17 g/10 min.

In yet another embodiment, the present invention provides an article, such as a pipe or fitting, made of the polyethylene composition as hereinbefore described.

In yet another embodiment, the present invention provides a use of the polyethylene composition for the production of the article as hereinbefore defined.

DETAILED DESCRIPTION OF THE INVENTION

Figure 1:
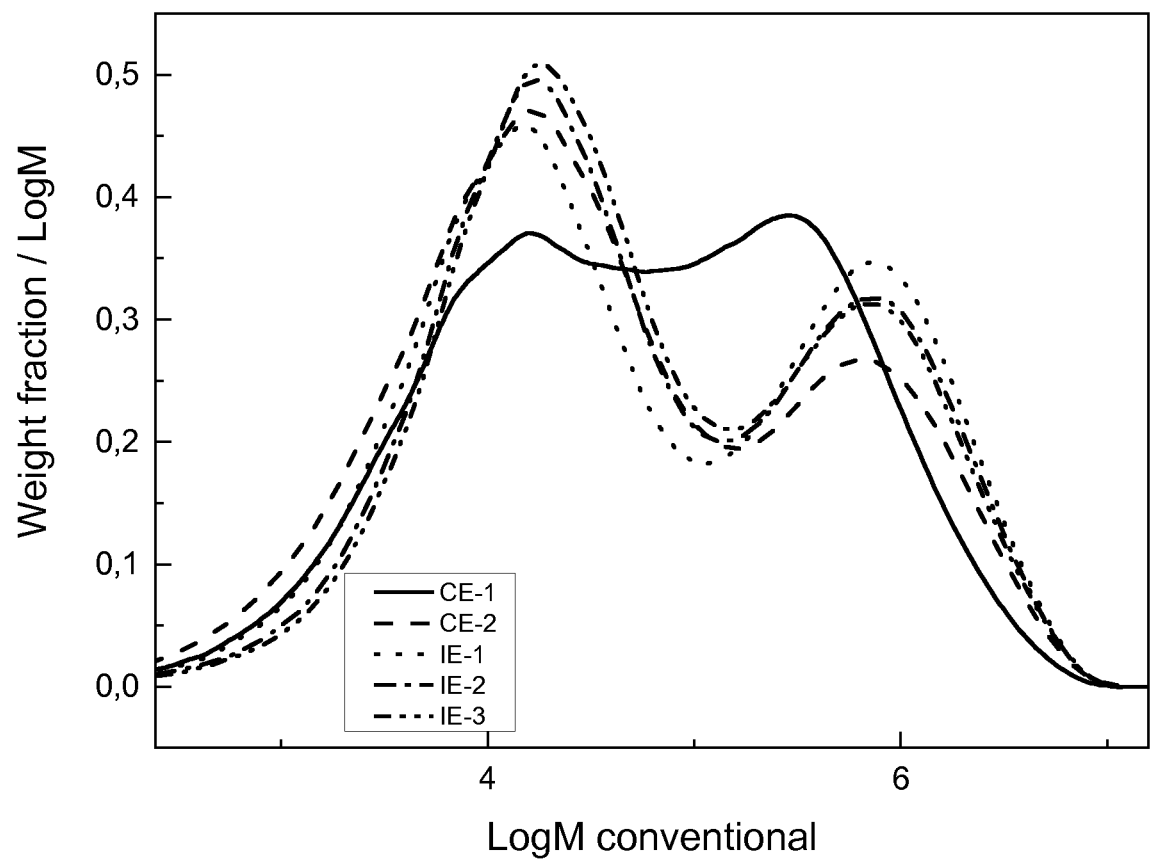
FIG. 1 shows Gel Permeation Chromatography (GPC) curves of embodiments in accordance with the invention and comparative examples.

The following detailed description includes specific embodiments, which should not limit the scope of the invention and the embodiments can be modified as set forth in the claims.

The embodiment applies to a polyethylene composition and a process for the production of the polyethylene composition, which can be used to make articles especially pipes and fittings, but not forgetting films, fibres and cable sheathings.

In the context of the present application the term fraction denotes a polymer component which has been produced in the presence of one polymerisation catalyst in one set of polymerisation conditions. Thereby three fractions may be produced by polymerising ethylene in three cascaded polymerisation reactors wherein the reactors are operated in different polymerisation conditions resulting in different molecular weights and/or comonomer contents of the polymer. Again, three fractions having different molecular weights and/or comonomer contents are produced.

The polyethylene composition comprises a base resin comprising only a polymeric material including at least three different polyethylene component fractions called herein fraction A1, A2 and fraction A3. Usually all polymer material of the polyethylene components is included in the base resin. Typically the amount of polymeric components or base resin is at least 90 wt % of the total polyethylene composition. The polyethylene composition may also comprise various additives, such as pigments, stabilizers (anti-oxidant agents), antacids and/or anti-UVs, antistatic agents and utilization agents (such as processing aid agents). Preferably the amount of these additives is 10 wt % or below, further preferred 8 wt % or below, still more preferred 6 wt % or below of the total composition. The composition may comprise carbon black in an amount of 8 wt % or below, preferably of 1 to 4 wt %, of the total composition. Carbon black can be added to the composition by any suitable means, preferably in the form of master batch including carbon black in an amount of more than 10 wt % of that master batch. Further preferred the amount of additives different from carbon black is 1.5 wt % or less, more preferably 1.0 wt % or less, most preferably 0.5 wt % or less.

Each component may have been produced under different polymerisation conditions, the polymer component of fraction A1 in a first polymerisation stage in a first reactor, the polymer component of fraction A2 in a second polymerisation stage in a second reactor, and the polymer component of fraction A3 in a third polymerisation stage in a third reactor resulting in different weight average molecular weights and molecular weight distributions. Typically the same polymerisation catalyst may be used in these three reactors. Also it is possible to produce under same polymerisation condition in the same reactor with bimodal catalyst two polymer components. Naturally more than three reactors can be used, too. Further fractions A1, A2 and A3 may be mixed to produce the polyethylene base resin.

The polymer component of fraction A1 may be a very high molecular weight polyethylene component, fraction A2 may be a low molecular weight polyethylene component having a weight average molecular weight lower than the very high molecular weight polyethylene component and fraction A3 may be a high molecular weight polyethylene component having a weight average molecular weight higher than the low molecular weight polyethylene_component but lower than the weight average molecular weight of the very high molecular weight component. If desired, the very high molecular weight polyethylene component may comprise, or even consist of, ultra-high molecular weight polyethylene components.

Optionally the base resin may comprise a prepolymer fraction in an amount of up to 10 wt %, preferably up to 5 wt %, more preferably up to 3 wt %.

The composition or the base resin comprising more than one fraction is called "multimodal". If the multimodal composition comprises two fractions, it is called "bimodal" and correspondingly if it comprises three fractions, it is called "trimodal". In this specific case the composition or base resin may be trimodal, when the prepolymer fraction is not included. The form of the molecular weight distribution curve, i.e. the appearance of the graph of the polymer weight fraction as function of its molecular weight, of such a multimodal polyethylene will show two or more maxima depending on the modality or at least be distinctly broadened in comparison with the curves for the individual fractions.

The very high molecular weight polyethylene component as fraction A1 may be an ethylene homopolymer or advantageously ethylene copolymer. The low molecular weight polyethylene component as fraction A2 may be an ethylene copolymer or advantageously ethylene homopolymer. The high molecular weight polyethylene component as fraction A3 may be an ethylene homopolymer or advantageously ethylene copolymer.

Ethylene homopolymer means a polymer which is formed essentially with only repeated units deriving from ethylene. Homopolymers may, for example, comprise at least 99.9 wt % of repeat units deriving from ethylene. It is possible that minor traces of other monomers may be present as impurity.

The comonomer content of each fraction may vary, in case comonomer is present during polymerisation. Typically the comonomer content of the low molecular weight polyethylene component may be lower than the comonomer content of the high molecular weight polyethylene component. The comonomer content of the very high molecular weight polyethylene component may be higher than the comonomer content of the low molecular weight polyethylene component. The comonomer content of the very high molecular weight polyethylene component may be higher than the comonomer content of the high molecular weight polyethylene component.

A polymeriseable olefin is called a comonomer if the weight fraction of the units derived from the olefin in the copolymer is less than the weight fraction of the units derived from ethylene. Further the comonomer molecule of fraction A1 may differ from the comonomer molecule of fraction A2 and A3. Typically the comonomer molecule of fraction A1 may be same as the comonomer molecule of fraction A2 and/or fraction A3. Usually comonomers are selected from alpha-olefin comonomers with 3-20 carbon atoms, preferably 4-12 carbon atoms, more preferably 4-8 carbon atoms. Preferably the comonomer of fraction A1 and A3 is 1-hexene.

The comonomer content of fraction A1 may be from 0 to 20 wt %, preferably from 0.1 to 15 wt %, more preferably from 0.2 to 13 wt %.

The amount of the very high molecular weight component of fraction A1 in the base resin may be 2 to 25 wt %, preferably 4 to 20 wt %, more preferably 5 to 15 wt %.

A density of the very high molecular weight component of fraction A1 determined according to ISO 1183 may be equal to or less than 940 kg/m$^3$, preferably equal to or less than 935 kg/m$^3$, more preferably equal to or less than 933 kg/m$^3$. The density of fraction A1 may be equal to or more than 890 kg/m$^3$, preferably equal to or more than 895 kg/m$^3$, more preferably equal to or more than 900 kg/m$^3$.

The very high molecular weight polyethylene component of fraction A1 may have a viscosity average molecular weight $M_v$ greater than 600 kg/mol, preferably greater than 700 kg/mol, more preferably greater than 800 kg/mol, calculated from its intrinsic viscosity according to ASTM D 4020-05. The very high molecular weight polyethylene component of fraction A1 may have a viscosity average molecular weight $M_v$ less than 4500 kg/mol, preferably less than 3300 kg/mol, more preferably less than 3100 kg/mol, even more preferably less than 3000 kg/mol.

An intrinsic viscosity (IV) of the very high molecular weight polyethylene component of fraction A1 determined according to the ISO 1628-3 may be equal to or higher than 5.0 dl/g, preferably equal to or higher than 6.0 dl/g, more preferably equal to or higher than 7.0 dl/g. An intrinsic viscosity (IV) of the very high molecular weight polyethylene component of fraction A1 may be equal to or less than 30 dl/g, preferably equal to or less than 28 dl/g, more preferably equal to or less than 26 dl/g, even more preferably equal to or less than 24 dl/g.

The amount of the low molecular weight polyethylene component of fraction A2 in the base resin according to the embodiment may be equal to or more than 45 wt %, preferably equal to or more than 50 wt %, more preferably equal to or more than 52 wt % by weight. The amount of the low molecular weight polyethylene component of fraction A2 in the base resin according to the embodiment may be equal to or less than 70 wt %, preferably equal to or less than 65 wt %, more preferably equal to or less than 60 wt % by weight.

The amount of the high molecular weight polyethylene component of fraction A3 in the base resin according to the embodiment may be 15 to 50 wt %, preferably 17 to 48 wt %, more preferably 18 to 46 wt %.

A melt flow rate MFR$_5$ of base resin or composition determined according to ISO 1133 may be equal to or less than 0.17 g/10 min, preferably equal to or less than 0.15 g/10 min, more preferably equal to or less than 0.13 g/10 min. The MFR$_5$ of base resin may be equal or higher than 0.005 g/10 min, preferably equal or higher than 0.01 g/10 min, more preferably equal to or higher than 0.015 g/10 min. The MFR$_5$ range of the polymer composition or the base resin may be 0.005 to 0.17 g/10 min, preferably 0.01 to 0.15 g/10 min, more preferably 0.015 to 0.13 g/10 min. MFR is an indication of flowability, and hence the processability of the polymer. The higher the melt flow rate, the lower the viscosity of the polymer composition or the base resin.

The base resin or composition may have a melt flow rate MFR$_{21}$ of equal to or less than 5.9 g/10 min, preferably equal to or less than 5.5 g/10 min, more preferably equal to or less than 5.0 g/10 min, even more preferably of equal to or less than 4.8 g/10 min determined according to ISO 1133. The MFR$_{21}$ of the base resin may be equal to or higher than 0.5 g/10 min, preferably equal to or higher than 1.0 g/10 min, more preferably equal to or higher than 1.5 g/10 min. The MFR$_{21}$ range of the base resin or composition may be 0.5 to 5.9 g/10 min, preferably 1.0 to 5.5 g/10 min, more preferably 1.5 to 5.0 g/10 min, even more preferably 1.5 to 4.8 g/10 min.

A density of the composition comprising the base resin and carbon black may be equal to or less than 975 kg/m$^3$, preferably equal to or less than 970 kg/m$^3$, more preferably equal to or less than 968 kg/m$^3$ determined according to ISO 1183/1872-2B. The density of the composition is equal to or more than 940 kg/m$^3$, preferably equal to or more than 950 kg/m$^3$, more preferably equal to or more than 955 kg/m$^3$.

Polyethylene composition may comprise at least 0.05 wt %, preferably at least 0.1 wt %, and more preferably at least 0.2 wt % of at least one alpha-olefin comonomer, such as 1-hexene.

A good processability of the polyethylene composition is desirable especially for pipe applications. High molecular weight is needed for meeting the requirements of good pressure resistance at elevated temperatures and low creep; however, processing of such high molecular weight resins is more difficult. Improved processability is reached by multimodal design of the base resin. Therefore at least one lower molecular weight component as fraction A2 is needed for easier processability of the composition, while the very high molecular weight component as fraction A1 and the high molecular weight component as fraction A3 contribute to the mechanical strength of the composition.

The term molecular weight denotes herein the weight average molecular weight $M_w$. The base resin or the polyethylene composition may have a molecular weight $M_w$ of at least 250 kg/mol, preferably at least 300 kg/mol, more preferably at least 350 kg/mol determined by GPC according to ISO 16014-1, 2, 4 and ASTM D 6474-12. The base resin or the polyethylene composition may have a molecular weight $M_w$ of less than 600 kg/mol, preferably less than 550 kg/mol, more preferably less than 500 kg/mol.

The number average molecular weight $M_n$ of the polyethylene composition or base resin may be higher than 7.0 kg/mol, preferably higher than 7.5 kg/mol, more preferably higher than 8.0 kg/mol determined by GPC according to ISO 16014-1, 2, 4 and ASTM D 6474-12. The number average molecular weight $M_n$ of the polyethylene composition or base resin may be less than 12.5 kg/mol, preferably less than 12.0 kg/mol, more preferably less than 11.5 kg/mol.

The polyethylene composition or base resin may have a Z average molecular weight $M_z$ higher than 1000 kg/mol, preferably higher than 1300 kg/mol, more preferably higher than 1600 kg/mol determined by GPC according to ISO 16014-1, 2, 4 and ASTM D 6474-12. The $M_z$ value of the polyethylene composition or base resin may be less than 3000 kg/mol, preferably less than 2800 kg/mol, more preferably less than 2600 kg/mol. $M_z$ indicates the presence of the very high molecular weight fraction.

The molecular weight distribution MWD can be calculated as the ratio of the weight average molecular weight to the number average molecular weight $M_w/M_n$. The composition or the base resin may have $M_w/M_n$ of equal to or less than 70, preferably equal to or less than 65, more preferably equal to or less than 60. The composition or the base resin may have $M_w/M_n$ of equal to or greater than 20, preferably equal to or greater than 25, more preferably equal to or greater than 30. This proves that the molecular weight distribution is very broad.

The polyethylene composition or the base resin may have a viscosity at shear stress of 747 Pa (eta747) of equal to or less than 34000 kPas, preferably equal to or less than 30000 kPas, more preferably equal to or less than 25000 kPas, even more preferably equal to or less than 20000 kPas. This high viscosity may be achieved when the composition comprises the very high molecular weight component; however, in order to ensure sufficient processability the amount of the low molecular weight component must then be kept at a sufficient level. It is therefore especially preferred that the amount of the low molecular weight component in the base resin is equal to more than 50 wt %. The polyethylene composition or the base resin may have a viscosity at shear stress of 747 Pa (eta747) of equal to or more than 4000 kPas, preferably equal to or more than 5000 kPas, more preferably equal to or more than 6000 kPas. The higher eta747 is, the lower is the sagging of the polyethylene composition. The high eta747 indicates the presence of high molecular weight polymer chains and also high $M_w$. The viscosity of the polymer at this shear stress is determined at a temperature of 190° C. by the test described in the experimental section and has been found to be inversely proportional to the gravity flow of the polymer, i.e. the greater the viscosity is, the lower is the gravity flow.

The polyethylene composition or the base resin may have a complex viscosity at 0.05 rad/s $Eta_{0.05\ rad/s}$ of equal to or more than 800 Kpa·s, preferably of equal to or more than 850 kPa·s, more preferably of equal to or more than 900 kPa·s.

The polyethylene composition or the base resin may have a complex viscosity at 0.05 rad/s $Eta_{0.05\ rad/s}$ of equal to or less than 1400 kPa·s, preferably of equal to or less than 1350 kPa·s, more preferably of equal to or less than 1300 kPa·s.

Also the polyethylene composition or the base resin may have a complex viscosity at 300 rad/s $Eta_{300\ rad/s}$ of equal to or more than 1300 Pa·s, preferably of equal to or more than 1350 Pa·s, more preferably of equal to or more than 1400 Pa·s.

The polyethylene composition or the base resin may have a complex viscosity at 300 rad/s $Eta_{300\ rad/s}$ of equal to or less than 1800 Pa·s, preferably of equal to or less than 1750 Pa·s, more preferably of equal to or less than 1700 Pa·s.

The polyethylene composition or the base resin may have a ratio of $Eta_{0.05\ rad/s}$ to $Eta_{300\ rad/s}$ of 500 to 1000, preferably of 550 to 950, more preferably 600 to 900, even more preferably of 650 to 850.

A strain hardening modulus of the composition measured according to ISO 18488 may be at least 95 MPa, preferably at least 100 MPa, more preferably at least 105 MPa. This feature is important for the lifetime of the pipe. Especially the strain hardening modulus indicates that the slow crack growth resistance of the composition is very good.

Catalyst (I)

The solid catalyst component used in (co)polymerisation of ethylene in inventive examples and one comparative example is a solid Ziegler-Natta catalyst component for ethylene polymerisation, which solid Ziegler-Natta catalyst component comprises magnesium, titanium, halogen and an internal organic compound. The internal donor is selected from bi-(oxygen containing ring) compounds of formula (I)

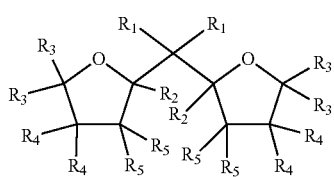

(I)

where $R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated.

Accordingly, the catalyst used in the present invention comprises a solid $MgCl_2$ supported component which is prepared by a method comprising the steps:
a) providing solid carrier particles of $MgCl_2$*mROH adduct
b) pre-treating the solid carrier particles of step a) with a compound of Group 13 metal
c) treating the pre-treated solid carried particles of step b) with a transition metal compound of Group 4 to 6
d) recovering the solid catalyst component wherein the solid carrier particles are contacted with an internal organic compound of formula (I) or isomers or mixtures therefrom before treating the solid carrier particles in step c)

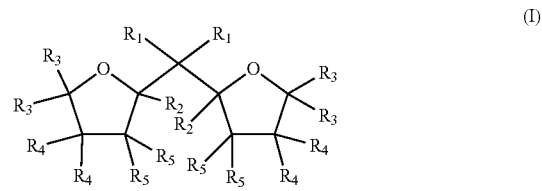

(I)

and wherein in the formula (I)

$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated, and R in the adduct $MgCl_2$*mROH is a linear or branched alkyl group with 1 to 12 C atoms, and m is 0 to 6.

Accordingly, the internal organic compound of formula (I) is contacted with the solid carrier particles before treatment of solid carrier particles with the transition metal compound of Group 4 to 6. Thus, said internal organic compound can be contacted with the solid carrier particles before step b), i.e. before pre-treating the solid carrier particles with Group 13 metal compound, or simultaneously with said pre-treatment step, or after step b), but before treating the solid carrier particles with the transition metal compound of Group 4 to 6.

Further, one object is to use the catalyst in accordance to what is disclosed below in the process for producing polyethylene in a multistage process.

The catalyst will be described in the following in greater detail, referring to the particular preferred embodiments.

As used herein, the term Ziegler Natta (ZN) catalyst component is intended to cover a catalyst component comprising a transition metal compound of Group 4 to 6, a compound of a metal of Group 13 of the Periodic Table (IUPAC, Nomenclature of Inorganic Chemistry, 1989) and an internal organic compound supported on $MgCl_2$ based carrier.

Magnesium dihalide is used as a starting material for producing a carrier. The solid carrier is a carrier where alcohol is coordinated with Mg dihalide, preferably $MgCl_2$. The $MgCl_2$ is mixed with an alcohol (ROH) and the solid carrier $MgCl_2$*mROH is formed according to the well-known methods. As examples, spray drying or spray crystallisation methods can be used to prepare the magnesium halide. Spherical and granular $MgCl_2$*mROH carrier materials of different sizes (5-100 μm) are suitable to be used in the present invention. The alcohol in producing MgCl$_2$*mROH carrier material is an alcohol ROH, where R is a linear or branched alkyl group containing 1 to 12 carbon atoms, preferably 1 to 8 carbon atoms, like 1 to 4 carbon atoms. Ethanol is typically used. In MgCl$_2$*mROH, m is from 0 to 6, more preferably from 1 to 4, especially from 2.7 to 3.3.

MgCl$_2$*mROH is available from commercial sources or can be prepared by methods described in prior art. Preparation methods of MgCl$_2$*mROH carrier is described in several patents e.g. in EP-A-376936, EP-A-424049, EP-A-655073 and EP-A-614467.

Group 13 metal compound, used in step b) is preferably an aluminium compound. Particularly preferably the aluminium compound is an aluminium compound of the formula Al(alkyl)$_x$X$_{3-x}$ (II), wherein each alkyl is independently an alkyl group of 1 to 12 carbon atoms, preferably 1 to 8 carbon atoms, more preferably 1 to 6 carbon atoms, X is halogen, preferably chlorine and 1<x≤3. The alkyl group can be linear, branched or cyclic, or a mixture of such groups.

Preferred aluminium compounds are dialkyl aluminium chlorides or trialkyl aluminium compounds, for example dimethyl aluminium chloride, diethyl aluminium chloride, di-isobutyl aluminium chloride, and triethylaluminium or mixtures therefrom. Most preferably the aluminium compound is a trialkyl aluminium compound, especially triethylaluminium compound.

The transition metal compound of Group 4 to 6 is preferably a Group 4 transition metal compound or a vanadium compound and is more preferably a titanium compound. Particularly preferably the titanium compound is a halogen-containing titanium compound of the formula X$_y$Ti(OR$^8$)$_{4-y}$, wherein R$^8$ is a C$_{1-20}$ alkyl, preferably a C$_{2-10}$ and more preferably a C$_{2-8}$ alkyl group, X is halogen, preferably chlorine and y is 1, 2, 3 or 4, preferably 3 or 4 and more preferably 4.

Suitable titanium compounds include trialkoxy titanium monochlorides, dialkoxy titanium dichloride, alkoxy titanium trichloride and titanium tetrachloride. Preferably titanium tetrachloride is used.

The internal organic compound is selected from bi-cyclic ether compounds of formula (I):

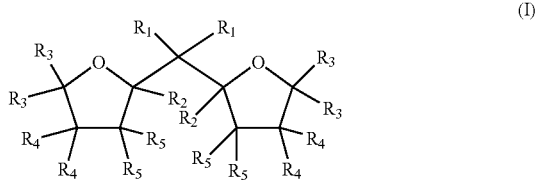

(I)

wherein in the formula (I)
R$_1$ to R$_5$ are the same or different and can be hydrogen, a linear or branched C$_1$ to C$_8$-alkyl group, or a C$_3$-C$_8$-alkylene group, or two or more of R$_1$ to R$_5$ can form a ring, and
whereby the two oxygen-containing rings are individually saturated or partially unsaturated or unsaturated.

Examples of preferred linear or branched C$_1$ to C$_8$-alkyl groups are methyl, ethyl, n-propyl, i-propyl, n-butyl, sec-butyl, tert-butyl, pentyl and hexyl groups.

Examples for preferred C$_3$-C$_8$-alkylene groups are pentylene and butylene groups.

The two R$_1$ are preferably the same and are a linear C$_1$ to C$_4$-alkyl groups, more preferably methyl or ethyl; or the two R$_1$ form a ring with the carbon atom they are attached to a ring with 3 to 7 carbon atoms, preferably cyclopentyl or cyclohexyl ring.

Most preferably both R$_1$ are methyl.

R$_2$ to R$_5$ are the same or different and are preferably H or a C$_1$ to C$_2$-alkyl groups, or two or more of R$_2$ to R$_5$ residues can form a ring. If one or more rings are formed by the residues R$_2$ to R$_5$, these are more preferably formed by R$_3$ and R$_4$ and/or R$_4$ and R$_5$.

Preferably the residues R$_2$ to R$_5$ do not form rings and more preferably at most two of the residues R$_2$ to R$_5$ are a methyl, the others are H. Most preferably R$_2$ to R$_5$ are all hydrogens.

Furthermore both oxygen-containing rings are preferably saturated or partially unsaturated or unsaturated. Each partially unsaturated or unsaturated oxygen-containing ring can have one or two double bonds.

More preferably both oxygen-containing rings are saturated.

In the most preferred embodiment, 2,2-di(2-tetrahydrofuryl)propane (DTHFP) is used with the isomers thereof. DTHFP is typically a 1:1 mol/mol diastereomeric mixture of D,L-(rac)-DTHFP and meso-DTHFP.

It has been found that using an internal organic compound that is enriched in isomers of DTHFP, that the catalyst morphological properties are not influenced. It was found that by using enriched rac-DTHFP, where the ratio of D,L-(rac)-DTHFP/meso-DTHFP is at least 2/1 mol/mol, it was possible to produce the catalyst morphology as good as with the equimolar (rac) and (meso) mixture.

Enrichment was surprisingly successful via complexation with MgCl$_2$.

When producing the supported catalyst component used in the present invention it is especially preferred that the internal organic compound, as defined above, is added to the catalyst mixture before, during or after the pre-treating of the MgCl$_2$-mROH with the Group 13 metal compound, but before treating it with the compound of a transition metal of Group 4 to 6.

Thus, according to one suitable method the solid catalyst component is prepared by a process comprising the steps of:
  i) providing solid MgCl$_2$*mROH carrier, wherein m is 1 to 4 and R is a linear or branched alkyl group containing 1 to 8 C atoms
  ii) pre-treating the solid carrier particles of step i) with an Al compound
  iii) adding the internal organic compound of formula (I) into the pre-treated solid carrier of step ii) or
  iii') simultaneously with step ii) adding the internal organic compound of formula (I) into the solid carrier
  iv) treating the pre-treated solid carried particles of step iii) or iii') with TiCl$_4$ and
  v) recovering the solid catalyst component Thus, according to another suitable method the solid catalyst component is prepared by a process comprising the steps of:
  i) providing solid MgCl$_2$*mROH carrier, wherein m is 1 to 4 and R is a linear or branched alkyl group containing 1 to 8 C atoms
  ii-1) adding the internal organic compound of formula (I) into the solid carrier of step i)
  iii-1) pre-treating the solid carrier particles of step ii-1) with an Al compound
  iv-1) treating the pre-treated solid carried particles of step iii-1) with TiCl$_4$ and
  v-1) recovering the solid catalyst component.

According to either one of the methods above the Al compound can be added to the solid carrier before or after adding the internal organic compound or simultaneously with the internal organic compound to the carrier.

Most preferably in the above-mentioned embodiments, m=2.7 to 3.3, ROH is ethanol, aluminium compound is an aluminium trialkyl compound, such as triethyl aluminium, and as internal organic compound is 2,2-di(2-tetrahydrofuryl)propane, or 2,2-di-(2-furan)-propane, especially 2,2-di(2-tetrahydrofuryl)propane or mixtures thereof.

According to the catalyst preparation method of the present invention the pre-treatment with the Group 13 metal compound, preferably an aluminium compound, can be done by adding a solution of said aluminium compound in inert organic solvent, preferably in inert aliphatic hydrocarbon solvent, for example in heptane. The method allows use of a concentrated aluminium compound solution. In the case where triethylaluminium (TEA) is used, a 15 to 100 wt-% solution of TEA in an inert hydrocarbon, preferably a 25 to 100 wt-% solution of TEA in inert aliphatic hydrocarbon solvent, like in heptane can be used, or neat TEA. It was found that by using these more concentrated solutions, the morphology remains advantageous and a reduced amount of waste is produced.

The final solid catalyst component typically has Mg/Ti mol/mol ratio of from 1 to 10, preferably from 2 to 8, especially from 3 to 7, Al/Ti mol/mol ratio of from 0.01 to 1, preferably from 0.1 to 0.5 and Cl/Ti mol/mol ratio of from 5 to 20, preferably from 10 to 17.

Preferably the particles of the solid catalyst component of the invention do not contain substantial amount of fines or agglomerates.

The supported catalyst component as described above allows the production of polymers with increased molecular weight. The increase in molecular weight is not made at the expense of the productivity of the catalyst. The productivity remains at an acceptably high level or is even increased compared to use of a catalyst component of similar type but using a different internal organic compound and/or prepared by adding the internal organic compound during or after the treatment step with TiCl$_4$, or using said organic compound as external additive. Thus, the performance of the catalyst prepared by the method of the present invention makes it possible to broaden the preparation window of the polyethylene such that polymerisation with both higher and lower amounts of hydrogen is possible while retaining good productivity.

The catalyst used in the process of the invention comprises, in addition to the solid catalyst component as defined above, a cocatalyst, which is also known as an activator. Cocatalysts are organometallic compounds of Group 13 metal, typically aluminium compounds. These compounds include alkyl aluminium halides, preferably alkyl aluminium chlorides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Also other aluminium alkyl compounds, such as isoprenylaluminium, may be used. Especially preferred cocatalysts are trialkylaluminiums, of which triethylaluminium, trimethylaluminium and tri-isobutylaluminium are particularly used.

The catalyst may also comprise an external additive, like external donor. External additives that can be used include ether compounds, typically tetrahydrofuran, siloxane or silane type of external donors and/or alkyl halides as is known from prior art. The final solid catalyst component, i.e. the ZN solid catalyst component, obtained according to any one of the above described methods, is combined with an activator.

Suitable activators are optionally halogenated aluminium alkyl cocatalysts of formula (V) $(C_1\text{-}C_4\text{-alkyl})_p\text{-Al}\text{---}X_{3-p}$, wherein X is chlorine, bromine, iodine or fluorine and p is 1, 2 or 3.

The $C_1$-$C_4$-alkyl groups can be linear or branched or cyclic, or a mixture of such groups.

X is preferably chlorine or bromine, most preferably X is chlorine.

Suitable activators are for example trimethyl aluminium (TMA), triethyl aluminium (TEA) dimethyl aluminium chloride (DMAC), diethyl aluminium chloride (DEAC), diisobutyl aluminium chloride (DIBAC), ethyl aluminium dichloride (EADC), methyl aluminium dichloride (MADC). A preferred activator used in the process is triethylaluminium.

The amount in which the activator is used depends on the specific catalyst and the activator. Typically triethylaluminium is used in such amount that the molar ratio of aluminium to the transition metal, like Al/Ti, is from 1 to 1000, preferably from 3 to 100 and in particular from about 5 to about 30 mol/mol.

Catalyst (II)

Another catalyst used in (co)polymerisation of ethylene in one of comparative examples was silica supported ZN catalyst. Catalyst was prepared according to the method disclosed hereinafter.

Polymerisation

The multimodal polyethylene composition may be produced in a multistage polymerisation process in the presence of Ziegler-Natta catalyst hereinbefore defined. Ethylene and optionally alpha-olefin comonomers with 3-20 carbon atoms, preferably with 3-12 carbon atoms, have been polymerised in a process comprising at least three consecutive polymerisation stages. Each polymerisation stage may be conducted in a separate reactor or same reactor. The polymerisation may be followed by a compounding step.

The base resin of the polyethylene composition may be polymerised via at least one slurry phase polymerisation, preferably two slurry phase polymerisation, and via at least one-step gas phase polymerisation, preferably one-step gas phase polymerisation. The very high molecular weight polyethylene component of fraction A1 and the low molecular weight polyethylene component of fraction A2 may be polymerised via a sequential slurry phase polymerisation, and the high molecular weight polyethylene component of fraction A3 may be polymerised via a gas phase polymerisation. Different polymerisation steps can be conducted in different reactors or just one reactor. The order when polymerising could be different. Typically the very high molecular weight component of fraction A1 is polymerised in the first reaction stage, the low molecular weight component of fraction A2 in the second reaction stage in the presence of the very high molecular weight component and the high molecular weight component of fraction A3 in the third reaction stage in the presence of fractions A1 and A2. The components from these reactors in series are mainly mixed, since fraction A1 is included when polymerising fraction A2 in the second stage and fractions A1 and A2 are included when polymerising fraction A3. The same polymerisation catalyst may be used in three steps. Also it is possible to produce in the first, second or third step in the presence of two or three different polymerisation catalysts the polymer components of fraction A1, fraction A2 and fraction A3.

Preferably the reaction stage in the slurry phase reactor is preceded by a prepolymerisation stage. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. Thus, the prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 55 to 75° C.

The pressure is not critical and is typically from 1 to 150 bar, preferably from 10 to 100 bar.

The amount of monomer is typically such that from about 0.1 to 1000 grams of monomer per one gram of solid catalyst component is polymerised in the prepolymerisation step. As the person skilled in the art knows, the catalyst particles recovered from a continuous prepolymerisation stage do not all contain the same amount of prepolymer. Instead, each particle has its own characteristic amount which depends on the residence time of that particle in the prepolymerisation stage. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen, if desired, as it is known in the art. Further, antistatic additive may be used to prevent the particles from adhering to each other or the walls of the reactor, as disclosed in WO-A-96/19503 and WO-A-96/32420.

The catalyst components are preferably all (separately or together) introduced to the prepolymerisation step when such prepolymerisation step is present. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

Typically, the amounts of hydrogen (if needed) and comonomer (if needed) are adjusted so that the presence of the prepolymer has no effect on the properties of the final multimodal polymer. Especially, it is preferred that the melt flow rate of the prepolymer is greater than the melt flow rate of the final polymer. Further, typically the amount of the prepolymer is not more than about 7% by weight of the multimodal polymer comprising the prepolymer.

In first-step slurry phase polymerisation when polymerising the very high molecular weight polyethylene component of fraction A1 as an inert diluent may be used hydrocarbon, such as ethane, propane, n-butane etc. Ethylene and optionally hydrogen and/or comonomer is introduced into the slurry reactor to produce polyethylene in the presence of Ziegler-Natta catalyst. In the embodiment no hydrogen was used to get the very high molecular weight polyethylene component. According to the embodiment comonomer may be 1-hexene. In case 1-hexene is used as a comonomer the ratio of 1-hexene to ethylene may be from 1 to 2000 mol/kmol, preferably from 10 to 1800 mol/kmol, more preferably from 20 to 1500 mol/kmol. In some embodiments comonomer may not be needed at all. Thus the very high molecular weight polyethylene can be either homo or copolymer.

The ethylene content in the fluid phase of the slurry in the first slurry phase polymerisation may be from 0.1 to 15% by mole, preferably from 0.2 to 10% by mole, even more preferably from 0.2 to 5% by mole. The benefit of having a high ethylene concentration is that the productivity of the catalyst is increased but the drawback is that more ethylene then needs to be recycled than if the concentration was lower.

The temperature in the first slurry phase polymerisation stage may be from 30 to 100° C., preferably from 40 to 90° C., more preferably from 50 to 80° C. The pressure may be from 10 to 150 bar, preferably from 30 to 110 bar, more preferably from 40 to 100 bar.

When polymerising the low molecular weight polyethylene component of fraction A2 in second slurry phase polymerisation stage hydrocarbon, such as ethane, propane, n-butane etc may be used as an inert diluent. Ethylene and preferably hydrogen is introduced into the loop phase to produce the low molecular weight polyethylene in the presence of Ziegler-Natta catalyst. To adjust the $MFR_2$ of the polyethylene hydrogen may be fed into the reactor. Preferably no comonomer is introduced into the slurry reactor, but if desired, comonomer, such as 1-hexene, may also be introduced into the second slurry phase polymerisation stage. Thus the low molecular weight polyethylene can be either homopolymer or copolymer.

The ethylene content in the fluid phase of the slurry in the second slurry phase polymerisation may be from 1 to 15% by mole, preferably from 3 to 12% by mole, even more preferably from 4.5 to 10% by mole.

The molar ratio of hydrogen to ethylene in the second slurry phase polymerisation may be from 100 to 1000 mol/kmol, preferably from 300 to 700 mol/kmol, more preferably from 350 to 600 mol/kmol. The temperature in the second slurry phase polymerisation may be from 50 to 115° C., preferably from 60 to 110° C., more preferably from 70 to 105° C. The pressure may be from 10 to 150 bar, preferably from 30 to 110 bar, more preferably from 40 to 100 bar.

The slurry phase polymerisation in the first and second slurry polymerisation stages may be conducted in any known reactor suitable for slurry phase polymerisation, e.g. in a continuous stirred tank reactor or a loop reactor. Loop reactors suitable in the slurry phase polymerisation are generally known in the art e.g. in U.S. Pat. Nos. 4,582,816, 3,405,109, 3,324,093, EP-A-479186 and U.S. Pat. No. 5,391,654.

The slurry can be withdrawn from the slurry phase polymerisation stage either continuously or intermittently. A preferred way of intermittent withdrawal is the use of settling legs where the slurry is allowed to concentrate before withdrawing a batch of the concentrated slurry from this stage. The use of settling legs is disclosed, amongst others, in U.S. Pat. Nos. 3,374,211, 3,242,150 and EP-A-1310295. Continuous withdrawal is disclosed e.g. in EP-A-891990, EP-A-1415999, EP-A-1591460 and WO-A-2007/

025640. Continuous withdrawal may be combined with a suitable concentration method as disclosed in EP-A-1415999 and EP-A-1591460.

Settling legs may be used to concentrate the slurry that is withdrawn from the slurry phase polymerisation stage. The withdrawn stream thus contains more polymer per volume than the slurry in average. This has the benefit that less liquid needs to be recycled back to the slurry phase polymerisation stage and thereby the costs of the equipment are lower. In commercial scale plants the fluid which is withdrawn with the polymer evaporates in a flash tank and from there it is compressed with a compressor and recycled into a slurry phase polymerisation stage.

However, the settling legs withdraw the polymer intermittently. This causes the pressure and other variables to fluctuate with the period of withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the polymerisation stage. To reduce the amount of hydrocarbons to be compressed the continuous outlet is advantageously combined with a suitable concentration device, such as hydrocyclone or sieve, as disclosed in EP-A-1415999 and EP-A-1591460. The polymer-rich stream is then directed to a flash and the polymer stream is returned directly into the polymerisation stage.

According to the embodiment from the first slurry phase polymerisation fraction A1 may be transferred to the second-step slurry phase polymerisation and from the second-step mixture of polymer fractions A1 and A2 may be transferred to the next stage of gas phase polymerisation. In the gas-phase polymerisation step an olefin is polymerised in the presence of Ziegler-Natta catalyst.

The polymer bed is fluidised with the help of a fluidisation gas comprising the olefin monomer, eventual comonomer(s), eventual chain growth controllers or chain transfer agents, such as hydrogen, and eventual inert gas used in the slurry phase polymerisation or inert gas can be different. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, E-A-600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be higher than minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practise. An overview is given, among others in Geldart: Gas Fluidization Technology, J.Wiley & Sons, 1986.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is removed from the top of the reactor, compressed and recycled into the inlet chamber of the reactor. Prior to the entry into the reactor fresh reactants are introduced into the fluidisation gas stream to compensate the losses caused by the reaction and product withdrawal. It is generally known to analyse the composition of the fluidisation gas and introduce the gas components to keep the composition constant. The actual composition is determined by the desired properties of the product and the catalyst used in the polymerisation.

After that the gas is cooled in a heat exchanger to remove the reaction heat. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutene, which are at least partially condensed in the cooler.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase polymerisation as disclosed in EP-A-1415999 and WO-A-00/26258.

The polymeric product may be withdrawn from the gas phase polymerisation either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase polymerisation if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

To control the molecular weight of the high molecular weight polyethylene in gas phase polymerisation stage then preferably no hydrogen is added to the gas phase polymerisation stage. If desired, hydrogen may, however, be added. Comonomer, which is in this embodiment 1-hexene, may then be introduced into the gas phase polymerisation stage so that the molar ratio of comonomer to ethylene is from 1 to 200 mol/kmol, and preferably from 20 to 170 mol/kmol, even more preferably from 50 to 150 mol/kmol. In some embodiments comonomer may not be needed at all. The high molecular weight polyethylene component can be either homo or copolymer.

The temperature in the gas phase polymerisation may be from 65 to 105° C., preferably from 70 to 100° C., more preferably from 75 to 95° C. The pressure may be from 10 to 30 bar, preferably from 15 to 25 bar.

Extrusion

When the polymer mixture has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilisers, neutralisers, lubricating agents, nucleating agents, pigments and so on. Carbon black may be mentioned as a typical pigment. The polyethylene composition may comprise all these additives. The amount of base resin in the polyethylene composition may vary from 85 to 100 wt %, preferably from 90 to 100 wt %, more preferably from 95 to 100 wt %.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 180 to 250 kWh/ton. The melt temperature is typically from 220 to 290° C.

Methods

Melt Flow Rate

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/5}$ denotes the value of $MFR_{21}/MFR_5$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.{klimke06, parkinson07, castignolles09} Standard single-pulse excitation was employed utilising the transient NOE at short recycle delays of 3 s {pollard04, klimke06} and the RS-HEPT decoupling scheme{fillip05,griffin07}.

A total of 1024 (1 k) transients were acquired per spectrum. This setup was chosen for high sensitivity towards low comonomer contents. When the determined comonomer content was observed to be below 0.2 mol % under these conditions sensitivity was increased by acquiring a total of 16384 (16 k) transients per spectrum. This setup was chosen for very high sensitivity towards very low comonomer contents.

Quantitative $^{13}C\{^1H\}$ NMR spectra were processed, integrated and quantitative properties determined using custom spectral analysis automation programs. All chemical shifts are internally referenced to the bulk methylene signal (6+) at 30.00 ppm {randall89}.

Characteristic signals corresponding to the incorporation of 1-hexene were observed (randall89) and all contents calculated with respect to all other monomers present in the polymer.

Characteristic signals resulting from isolated 1-hexene incorporation i.e. EEHEE comonomer sequences, were observed. Isolated 1-hexene incorporation was quantified using the integral of the signal at 38.29 ppm assigned to the *B4 sites, accounting for the number of reporting sites per comonomer:

$$H = I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

Characteristic signals resulting from saturated end-groups were observed. The content of such saturated end-groups was quantified using the average of the integral of the signals at 22.84 and 32.23 ppm assigned to the 2s and 3s sites respectively:

$$S = (1/2) * (I_{2S} + I_{3S})$$

The relative content of ethylene was quantified using the integral of the bulk methylene (6+) signals at 30.00 ppm:

$$E = (1/2) * I_{\delta+}$$

The total ethylene comonomer content was calculated based the bulk methylene signals and accounting for ethylene units present in other observed comonomer sequences or end-groups:

$$E_{total} = E + (5/2) * H + (3/2) * S$$

The total mole fraction of 1-hexene in the polymer was then calculated as:

$$fH = (H_{total}) / (E_{total} + H_{total})$$

The total comonomer incorporation of 1-hexene in mole percent was calculated from the mole fraction in the usual manner:

$$H[\text{mol \%}] = 100 * fH$$

The total comonomer incorporation of 1-hexene in weight percent was calculated from the mole fraction in the standard manner:

$$H[\text{wt \%}] = 100 * (fH * 84.16) / ((fH * 84.16) + ((1 - fH) * 28.05))$$

klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
randall89
J. Randall, Macromol. Sci., Rev. Macromol. Chem. Phys. 1989, C29, 201.

Molecular Weight Averages, Molecular Weight Distribution ($M_n$, $M_w$, $M_z$, MWD)

Molecular weight averages ($M_z$, $M_w$ and $M_n$), Molecular weight distribution (MWD) and its broadness, described by polydispersity index, PDI=$M_w/M_n$ (wherein $M_n$ is the number average molecular weight and $M_w$ is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight ($M_w$), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS} = 19 \times 10^{-3} \text{ mL/g}, \alpha_{PS} = 0.655$$

$$K_{PE} = 39 \times 10^{-3} \text{ mL/g}, \alpha_{PE} = 0.725$$

$$K_{PP} = 19 \times 10^{-3} \text{ mL/g}, \alpha_{PP} = 0.725$$

A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Nominal Viscosity Molecular Weight

Nominal viscosity molecular weight is calculated from the intrinsic viscosity [0] according to ASTM D 4020-05

$$M_v = 5.37 \times 10^4 \times [\eta]^{1.37}$$

Strain Hardening Modulus

Strain hardening modulus of the compounds was obtained from a tensile stress-strain curve above the natural draw ratio and represents the slope of the increase in the stress-strain trend at very high strains (the strain hardening regime). It was measured at 80° C. and 20 mm/min on preconditioned (120° C./1 h) 300 µm thick specimens according to ISO 18488.

Rheology

The characterisation of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at temperature 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively
$\omega$ is the angular frequency
$\delta$ is the phase shift (loss angle between applied strain and stress response)
t is the time Dynamic test results are typically expressed by means of several different rheological functions, namely the shear storage modulus G', the shear loss modulus, G'', the complex shear modulus, G*, the complex shear viscosity, $\eta^*$, the dynamic shear viscosity, $\eta'$, the out-of-phase component of the complex shear viscosity $\eta''$ and the loss tangent, tan $\delta$ which can be expressed as follows:

$$G' = \frac{\sigma_0}{\gamma_0} \cos\delta \ [Pa] \quad (3)$$

$$G'' = \frac{\sigma_0}{\gamma_0} \sin\delta \ [Pa] \quad (4)$$

$$G^* = G' + iG'' \ [Pa] \quad (5)$$

$$\eta^* = \eta' - i\eta'' \ [Pa \cdot s] \quad (6)$$

$$\eta' = \frac{G''}{\omega} \ [Pa \cdot s] \quad (7)$$

$$\eta'' = \frac{G'}{\omega} \ [Pa \cdot s] \quad (8)$$

The values of storage modulus (G'), loss modulus (G''), complex modulus (G*) and complex viscosity ($\eta^*$) were obtained as a function of frequency ($\omega$). Thereby, e.g. $\eta^*_{0.05\ rad/s}$ (eta*$_{0.05\ rad/s}$) is used as abbreviation for the complex viscosity at the frequency of 0.05 rad/s or $\eta^*_{300\ rad/s}$ (eta*$_{300\ rad/s}$) is used as abbreviation for the complex viscosity at the frequency of 300 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "—Interpolate y-values to x-values from parameter" and the "logarithmic interpolation type" were applied.

Rheological Parameter Eta 747:

One method which correlates well with the sagging properties, and is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "Encyclopedia of Polymer Science and Engineering", 2nd Ed., Vol. 14, pp. 492-509. The measurements are performed under a constant shear stress between two 25 mm diameter plates (constant rotation direction). The gap between the plates is 1.2 mm. A 1.2 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

Intrinsic Viscosity (IV) Measurement

The reduced viscosity (also known as viscosity number), $\eta_{red}$, and intrinsic viscosity, $[\eta]$, of the very high molecular weight polyethylene component are determined according to the principles of ISO 1628-3: "Determination of the viscosity of polymers in dilute solution using capillary viscometers".

Relative viscosities of a diluted polymer solution with concentration between 0.05-0.1 mg/ml and of the pure solvent (decahydronaphthalene stabilised with 200 ppm 2,6-bis(1,1-dimethylethyl)-4-methylphenol) are determined in an automated capillary viscometer (Lauda PVS1) equipped with 4 Ubbelohde capillaries placed in a thermostatic bath filled with silicone oil. The bath temperature is maintained at 135° C. Each measuring stand is equipped with electronics to control pump, valve function, time measurement, meniscus detection and has a magnetic stirrer. Polymer powder samples are pressed to compressed plaques using a hydraulic press (OMCI 10 t hydraulic press) at 190° C. at maximum pressure (10 t). The polymer powder is molten at 190° C. between 2-5 minutes. The compressed plaques or polymer granulates are directly placed into the capillary. The capillary is filled with the exact volume of solvent by use of an automatic pipette. The sample is dissolved with constant stirring until complete dissolution is achieved (typically within 300 min).

The efflux time of the polymer solution as well as of the pure solvent are measured several times until three consecutive readings do not differ for more than 0.2 s (standard deviation).

The relative viscosity of the polymer solution is determined as the ratio of averaged efflux times in seconds obtained for both, polymer solution and solvent:

$$\eta_{rel} = \frac{t_{solution} - t_{solvent}}{t_{solvent}} \quad [\text{dimensionless}]$$

Reduced viscosity ($\eta_{red}$) is calculated using the equation:

$$\eta_{red} = \frac{t_{solution} - t_{solvent}}{t_{solvent} * C} \quad [dl/g]$$

where C is the polymer solution concentration at 135° C.:

$$C = \frac{m}{V\gamma},$$

and m is the polymer mass, V is the solvent volume, and $\gamma$ is the ratio of solvent densities at 20° C. and 135° C. ($\gamma = \rho_{20}/\rho_{135} = 1.107$).

The calculation of intrinsic viscosity [$\eta$] is performed by using the Schulz-Blaschke equation from the single concentration measurement:

$$\eta = \frac{\eta_{red}}{1 + K \cdot C \cdot \eta_{red}}$$

where K is a coefficient depending on the polymer structure and concentration. For calculation of the approximate value for [$\eta$], K=0.27.

The corresponding $M_v$ values are calculated using the following Mark Houwink equation:

$$M_v = 5.37 \times 10^4 [\eta]^{1.37}.$$

CRB (Crack Round Bar)

The Cracked Round Bar (CRB) test method according ISO 18489 was used to determine the resistance to slow crack growth of the materials. Herein, round bar specimen of diameter 14 mm and a circumferential razor blade notch of depth 1.5 mm are cyclically loaded with a sinusoidal waveform at a frequency of 10 Hz and a ratio of maximum to minimum load (i.e. the R-ratio) of 0.1. Tests were performed at room temperature (23° C.+/−2° C. and 50%+/−10% relative humidity). The cycles to failure are measured as a function of the applied stress amplitude ($\Delta\sigma$ in MPa). A linear regression was built on a double logarithmic scale of stress amplitude ($\Delta\sigma$ in MPa) vs. failure cycles (N in −) for all tests displaying brittle failure. Brittle failures are defined by (1) the fracture surface displaying fibrillation and no large ductile deformation
(2) steeper slope in the log $\Delta\sigma$ versus N plot Materials with better slow crack growth performance display higher cycles to failure at the same stress level and thus a shift of the linear log $\Delta\sigma$ versus log N correlation to longer failure cycles

EXAMPLES

Catalyst (I) Preparation
A. Preparation of Pre-Treated Support Material:

A jacketed 160 dm³ stainless steel reactor equipped with a helical mixing element was pressurized with $N_2$ to 2.0 barg and depressurized down to 0.2 barg until the $O_2$ level was less than 3 ppm. The vessel was then charged with heptane (20.5 kg) and 2,2-di(tetrahydrofuryl)propane (0.520 kg; 2.81 mol; DTHFP). The obtained mixture was stirred for 20 min at 40 rpm. The $MgCl_2$*3EtOH carrier (6.6 kg; DTHFP/Mg=0.1 mol/mol; 27.5 mol of Mg; Mg 10.18 wt-%, d10=9.5 µm, d50=17.3 µm and d90=28.5 µm, granular shaped) was added to the reactor with stirring. This suspension was cooled to approximately −20° C. and the 33 wt % solution of triethylaluminum (29.8 kg, 84.3 mol of Al; Al/EtOH=1.0 mol/mol) in heptane was added in aliquots during 3 h 20 min time while keeping the temperature below 10° C. After the TEA addition, the reaction mixture was gradually heated to 80° C. over a period of 2 h 40 min and kept at this temperature for additional 20 min at 40 rpm. The suspension was allowed to settle for 10 min, and the mother liquor was removed through a 10 µm filter net in the bottom of the reactor during 30 min. The vessel was charged with warm toluene (43 kg) and then stirred at 40 rpm for 20 min at 36-61° C. The suspension was allowed to settle for 10 min at 50-55° C. and the liquid removed through a 10 µm filter net in the bottom of the reactor during 15 min.

B. Catalyst (I) Preparation:

The vessel containing the pre-treated support material was charged with toluene (43 kg) and then cooled to approximately 30° C. Neat $TiCl_4$ (5.25 kg, 27.5 mol; Ti/Mg=1.0 mol/mol) was added. The obtained suspension was heated to approximately 90° C. over a period of 2 h 15 min and kept at this temperature for additional 1 h with stirring at 40 rpm. The suspension was allowed to settle for 10 min at approximately 90° C. and the mother liquor was removed through a 10 µm filter net in the bottom of the reactor during 15 min. The obtained solid material was washed twice with toluene (43 kg each) at ≈90° C. and once with heptane (34 kg) at ~40° C. All three of these washing steps used the same sequence of events: addition of preheated (90 or 40° C.) solvent, then stirring at 40 rpm for 30 min, allowing the solid to settle for 10 min, and then removal of liquid through a 10 µm filter net in the bottom of the reactor during 15 min.

The obtained catalyst was mixed with 20 kg of white oil and dried 4 h at 40-50° C. with nitrogen flow (2 kg/h) and vacuum (−1 barg). The catalyst was taken out from the reactor and reactor was flushed with another 20 kg of oil and taken out to the same drum. The dry catalyst yield was 3.76 kg (93.7% based on Mg).

Catalyst (II) Preparation
A. Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

B. Solid Catalyst Component Preparation:

330 kg silica (calcined silica, Sylopol® 2100 provided by Grace) and pentane (0.12 kg/kg carrier) were charged into a catalyst preparation reactor. Then EADC (Ethylaluminium dichloride) (2.66 mol/kg silica) was added into the reactor at a temperature below 40° C. during two hours and mixing was continued for one hour. The temperature during mixing was 40-50° C. Then Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. Finally, $TiCl_4$ (1.47 mol/kg silica) was added during at least 1 hour at 55° C. to the reactor. The slurry was stirred at 50-60° C. for five hours. The catalyst was then dried by purging with nitrogen.

Molar composition of the ready catalyst is: Al/Mg/Ti=1.5/1.4/0.8 (mol/kg silica).

Inventive Examples 1-3

Trimodal samples were prepared using a stirred autoclave reactor with volume of 20.9 L via a three-step polymerisation. All the trimodal samples possess a VHMWPE copolymer fraction (from first step slurry polymerisation), a LMw homopolymer fraction (from second step slurry polymerisation) and a HMw copolymer fraction (from GPR at third step). Reaction parameters and properties of the inventive examples are shown in Table 1.

A prepolymerisation was first performed. The reactor was thermostated to 25° C. and then charged with 3.4 kg of liquid propane and 2000 mg of solid polymerisation catalyst (I) disclosed hereinabove together with triethylaluminium cocatalyst so that the molar ratio of TEA to titanium was Al/Ti=15. Then 1-hexene and ethylene were introduced into the reactor so that the concentration of ethylene was 4 mol % in liquid phase and the molar ratio of 1-hexene to ethylene in the liquid phase at beginning of polymerisation was 145 mol/kmol. After completing the feed of 1-hexene and ethylene, the reactor was heated up to 60° C. and the pressure was maintained at a constant level by continuous addition of ethylene. The amount of polymer was such that it approximately comprised 1 wt % of the total polymer produced in the experiment.

The reactants were then removed from the reactor. After the venting, 3.4 kg of propane was added into the reactor while maintaining the reactor at 60° C. Then ethylene feed was started so that its concentration in the liquid phase was 2 mol-%. At the same time 1-hexene was added into the reactor so that the molar ratio of 1-hexene to ethylene in the liquid phase was at the beginning 50 mol/kmol for inventive example 1.602 mol/kmol for inventive example 2 and 1250 mol/kmol for inventive example 3. Ethylene was continuously added into the reactor to keep the pressure constant.

After the first polymerisation step, the hydrocarbon components were vented from the reactor. 3.4 kg of propane was added into the reactor. Then, hydrogen at a pressure disclosed in table 1 for each inventive example together with ethylene were introduced into the reactor so that the concentration of ethylene was 7.1 mol % in superficial fluid. Simultaneously the reactor was heated to 95° C. for polymerisation. After the second polymerisation step, the hydrocarbons and hydrogen were vented from the reactor. Then propane in vapour phase was added to the reactor so that the pressure was 16.5 barg at 82° C. Then ethylene and 1-hexene were fed into the reactor in the ratio of 1-hexene to ethylene of 125 mol/kmol to reach the final pressure 18.5 barg at 85° C. Thereafter the pressure was maintained by continuous addition of the above-mentioned mixture of 1-hexene and ethylene in the ratio of 0.02 g/g. The reaction was terminated by venting the reactor after the third polymerisation step. The polymer was then recovered, dried, weighed and analysed.

The production split (weight-% prepolymer/weight-% $1^{st}$ stage component/weight-% $2^{nd}$ stage component/weight-% $3^{rd}$ stage component) was 1/7/54/38 for inventive example 1. The production split (weight-% prepolymer/weight-% $1^{st}$ stage component/weight-% $2^{nd}$ stage component/weight-% $3^{rd}$ stage component) was 1/9/53/37 for inventive example 2. The production split (weight-% prepolymer/weight-% $1^{st}$ stage component/weight-% $2^{nd}$ stage component/weight-% $3^{rd}$ stage component) was 1/9/54/36 for inventive example 3.

The polymer powder was mixed under nitrogen atmosphere with 1500 ppm of Ca-stearate, 2200 ppm of Irganox B225 and 57500 ppm of HE0880-A (CB MB containing 40% CB). Then it was compounded and extruded to pellets by using a ZSK 18 extruder at a throughput rate of 1 kg/h, barrel temperature of 230° C. and screw speed of 120 rpm.

Comparative Example 1

This comparative example is a blend of a first bimodal sample containing a very high molecular weight polyethylene and a low molecular weight homopolymer and a second bimodal sample containing a high molecular weight polyethylene and a low molecular weight homopolymer. Catalyst (II) was used, when producing the first bimodal sample. This catalyst differs from the catalyst (I) used in inventive examples IE1, IE2 and IE3. The catalyst of the second bimodal sample is Lynx 200, which is commercially available Ziegler-Natta catalyst supplied by BASF. Thus this comparative example 1 is a trimodal sample achieved via blending of the very high molecular weight polyethylene containing the first bimodal sample with the high molecular weight polyethylene containing the second bimodal sample.

The first bimodal sample was produced via a two-step slurry polymerisation with catalyst (II) using a stirred autoclave reactor with volume of 20.9 L. During prepolymerisation the reactor was charged with 3.4 kg of liquid propane and 600 mg of solid polymerisation catalyst (II) together with triethylaminium cocatalyst, so that the molar ratio of TEA to titanium was Al/Ti=15. Then ethylene was introduced at 25° C. into the reactor so that the concentration of ethylene was 2.8 mol % in liquid phase. After completing the feed of ethylene, the reactor was heated up 40° C. as shown in Table 1 and the pressure was maintained at a constant level by continuous addition of ethylene. The amount of prepolymer is very low and less than 1% of the total trimodal sample and therefore difficult to calculate. The prepolymer is added to the very high molecular weight polyethylene split in the final polymer.

The reactants were then removed from the reactor. After the venting, 3.4 kg of propane was added into the reactor thermostated to 50° C. Then 1-hexene and t ethylene feed was started to reach 17 bar at 50° C. The pressure was maintained by using ethylene only.

After the first polymerisation step, the hydrocarbon components were vented from the reactor. 3.4 kg of propane was added into the reactor. Then, hydrogen together with ethylene were introduced into the reactor to reach 48 barg at 85° C. The pressure was maintained using ethylene. After the second polymerisation step, the hydrocarbons and hydrogen were vented from the reactor.

The second bimodal sample description:

The second bimodal sample was produced as described in Example 3, material C (denoted as °) of WO 00/22040.

The polymer powder of the second bimodal sample was mixed under nitrogen atmosphere with 1500 ppm of Ca-stearate, 2200 ppm of Irganox B225, 57500 ppm of HE0880-A (CB MB containing 40% CB) and 105300 ppm of the first bimodal sample (planned second bimodal sample: first bimodal sample=75:25). Then it was compounded and extruded to pellets by using a ZSK 18 extruder at a throughput rate of 1 kg/h, barrel temperature of 230° C. and screw speed of 120 rpm. The density, the $MFR_5$, the $MFR_{21}$, $FRR_{21/5}$, the $C_6$ wt % of pellets are listed in Table 1.

Comparative Example 2

The catalyst in comparative example CE2 is catalyst (I), which is same as used in inventive examples IE1, IE2 and IE3. A stirred autoclave reactor with volume of 20.9 L was used during prepolymerisation. The reactor was charged with 3.4 kg of liquid propane and 2000 mg of solid polymerisation catalyst (II) together with triethylaluminium cocatalyst so that the molar ratio of TEA to titanium was Al/Ti=15. Then ethylene and hydrogen were introduced into the reactor at 25° C. so that the concentration of ethylene was 4 mol % in liquid phase. After completing the feed of ethylene, the reactor was heated up to 60° C. and the pressure was maintained at a constant level by continuous addition of ethylene The amount of prepolymer is very low and less than 1% of the total bimodal sample and therefore difficult to calculate.

No very high molecular weight component was prepared.

The reactants were then removed from the reactor. The reactor was heated up to 95° C. and the pressure was raised up to a target pressure of 55 barg. 3.4 kg of propane was added into the reactor. Then, of hydrogen together with ethylene were introduced into the reactor so that the concentration of ethylene was 7.1 mol % in superficial fluid. The hydrocarbons and hydrogen were vented from the reactor after the first polymerisation step. Then propane in vapour phase was added to the reactor so that the pressure was 16.5 barg at 82° C. Eethylene and 1-hexene were fed into the reactor in the ratio of 1-hexene to ethylene of 125 mol/kmol to reach the final pressure 18.5 barg at 85° C. Thereafter the pressure was maintained by continuous addition of the above-mentioned mixture of 1-hexene and ethylene in the ratio of 0.02 g/g. No $H_2$ feeding was used. The reaction was terminated by venting the reactor after the second polymerisation step. The polymer was then recovered, dried, weighed and analysed.

The polymer powder was mixed, compounded and extruded to pellets in the same way as disclosed in pursuance of the inventive example 1. Reaction parameters and properties of the IE1, IE2, IE3, CE1 and CE2 materials including pellets are shown in Table 1.

TABLE 1

| | IE1 | IE2 | IE3 | First bimodal sample of CE1 | CE2 |
|---|---|---|---|---|---|
| Catalyst Prepolymer | I | I | I | II | I |
| Temp ° C. | 60 | 60 | 60 | 40 | 60 |
| H2/C2 (mol/kmol) | 0 | 0 | 0 | 0 | 345 |
| C6/C2 at beginning (mol/kmol) | 145 | 145 | 145 | 0 | 0 |
| Pressure (Barg) | 22.6 | 22.6 | 22.6 | 12.6 | 32.3 |
| Split (wt %) | 1 | 1 | 1 | 3 | 0.8 |
| 1st step slurry polymerisation (VHMW): | | | | | |
| Temp ° C. | 60 | 60 | 60 | 50 | |
| H2/C2 (mol/kmol) | 0 | 0 | 0 | 0 | |
| C6 (wt %) in VHMW | 0.4 | 4.6 | 10.5 | 0.6 | |
| C6/C2 (mol/kmol) | 50 (at beginning) | 602 (at beginning) | 1250 (at beginning) | 152 (at beginning, without continuous feeding) | |
| C6/C2 (g/g) Continuous | 0.004 | 0.03 | 0.08 | 0 | |
| Pressure (Barg) | 21 | 21 | 20 | 17 | |
| Ethylene concentration (mol-%) | 2 | 2 | 2 | 11.4 | |
| Split (wt %) | 7 | 9 | 9 | 75 | 0 |
| Density (kg/m³) | 928 | 915 | 905 | | |
| MFR2 (g/10 min) | 0 | 0 | 0 | 0 | |
| IV (dl/g) | 14 | 11 | 8 | | |
| $M_v$ (kg/mol) | 2082 | 1427 | 991 | | |
| 2nd step slurry polymerisation (LMW): | | | | | |
| Temp ° C. | 95 | 95 | 95 | 85 | 95 |
| Pressure (barg) | 55 | 55 | 55 | 48 | 55 |
| H2/C2 (mol/kmol) | 480 | 480 | 480 | 213 | 480 |
| C6/C2 (mol/kmol) | 0 | 0 | 0 | 0 | 0 |
| Ethylene concentration (mol-%) | 7.1 | 7.1 | 7.1 | 9.4 | 7.1 |
| Split (wt %) | 54 | 53 | 54 | 22 | 60 |
| MFR2 (g/10 min) | 350 | 350 | 350 | 310 | 350 |
| Gas phase polymerisation (HMW): | | | | | |
| Temp ° C. | 85 | 85 | 85 | | 85 |
| H2/C2 (mol/kmol) | 0 | 0 | 0 | | 0 |
| C6/C2 (mol/kmol) | 125 (at beginning) | 125 (at beginning) | 125 (at beginning) | | 125 (at beginning) |
| Pressure (Barg) | 18.5 | 18.5 | 18.5 | | 18.5 |
| Split (wt %) | 38 | 37 | 36 | | 40 |
| Pellets: | IE1 | IE2 | IE3 | CE1* | CE2 |
| Density** (kg/m³) | 963 | 962 | 960 | 959 | 968 |

TABLE 1-continued

|  | IE1 | IE2 | IE3 | First bimodal sample of CE1 | CE2 |
|---|---|---|---|---|---|
| $MFR_5$ (g/10 min) | 0.03 | 0.02 | 0.09 | 0.09 | 0.13 |
| $MFR_{21}$ (g/10 min) | 1.8 | 4.2 | 2.9 | 3.7 | 11.7 |
| $FRR_{21/5}$ | 59 | 209 | 33 | 41 | 90 |
| C6 (wt %) | 0.7 | 1.1 | 1.4 | 1.9 | 0.7 |

*First bimodal sample + second bimodal sample
**With carbon black

Properties of Compositions

TABLE 2

|  | IE1 | IE2 | IE3 | CE1 | CE2 |
|---|---|---|---|---|---|
| Eta 747 (kPa · s) | 12018 | 10566 | 8686 | 1760 | 3908 |
| $Eta_{0.05\ rad/s}$ (kPa · s) | 1218 | 1154 | 1034 | 334 | 637 |
| $Eta_{300\ rad/s}$ (kPa · s) | 1.612 | 1.543 | 1.466 | 1.422 | 1.079 |
| $Eta_{0.05}/Eta_{300}$ | 755 | 748 | 705 | 235 | 590 |
| $M_n$ (kg/mol) | 8.7 | 10 | 10.9 | 8.5 | 6.7 |
| $M_w$ (kg/mol) | 466 | 426 | 420 | 302 | 360 |
| $M_z$ (kg/mol) | 2315 | 2260 | 2275 | 1705 | 2255 |
| $M_w/M_n$ (= PD) | 54 | 43 | 39 | 36 | 54 |
| Strain hardening modulus (MPa) | 112 | 114 | 119 | 84 | 88 |

Selected properties of polymer compositions of inventive examples 1-3 and comparative examples 1-2 are shown in table 2.

Properties of Compositions of Additional Comparative Examples Representing Some Examples of EP 2799487

Selected properties of additional comparative examples 3, 4 and 5 representing compositions of inventive examples 10, 11, and 12 of European Patent Application no. 2799487 are shown in table 3. These compositions were prepared following the preparation method of that application. More data about these examples can be found from that European Patent Application.

TABLE 3

|  | CE 3 (= IE-10 of EP 2799487) | CE4 (= IE-11 of EP 2799487) | CE5 (= IE-12 of EP 2799487) |
|---|---|---|---|
| Eta 747 (kPa · s) |  |  |  |
| $Eta_{0.05\ rad/s}$ (kPa · s) | 249 | 638 | 705 |
| $Eta_{300\ rad/s}$ (kPa · s) | 1.173 | 1.700 | 1.492 |
| $M_n$ (kg/mol) | 8.1 | 11 | 9.7 |
| $M_w$ (kg/mol) | 268 | 389 | 410 |
| $M_z$ (kg/mol) | 1709 | 2447 | 2702 |
| $M_w/M_n$ (= PD) | 33 | 35 | 42 |
| Strain hardening modulus (MPa) | 102 | 87 | 71 |

Properties of Compositions of Additional Comparative Examples Representing Some Examples of EP 2860203

Selected properties of additional comparative examples 6, 7, 8, 9, 10, 11, 12, 13, 14 and 15 representing polymer compositions of inventive examples 1, 2, 3, 4, 5, 6, 7, 8, 9 and 10 of European Patent Application no. 2860203 are shown in table 4. Thus CE6 corresponds to IE-1 of EP 2860203, CE7 corresponds to IE-2 of EP 2860203, CE8 corresponds to IE-3 of EP 2860203, CE9 corresponds to IE-4 of EP 2860203, CE10 corresponds to IE-5 of EP 2860203, CE11 corresponds to IE-6 of EP 2860203, CE12 corresponds to IE-7 of EP 2860203, CE13 corresponds to IE-8 of EP 2860203, CE14 corresponds to IE-9 of EP 2860203 and CE15 corresponds to IE-10 of EP 2860203. These compositions were prepared following the preparation method of that application. More data about these examples can be found from that European Patent Application.

TABLE 4

|  | CE6 | CE7 | CE8 | CE9 | CE10 | CE11 | CE12 | CE13 | CE14 | CE15 |
|---|---|---|---|---|---|---|---|---|---|---|
| $Eta_{0.05\ rad/s}$ (kPa · s) | 452 | 391 | 330 | 471 | 357 | 448 | 482 | 478 | 348 | 287 |
| $Eta_{300\ rad/s}$ (kPa · s) | 1.342 | 1.270 | 1.232 | 1.358 | 1.281 | 1.549 | 1.532 | 1.279 | 1.442 | 1.358 |
| $M_n$ (kg/mol) | 7.5 | 7.3 | 7.7 | 9.0 | 9.0 | 8.0 | 8.0 | 6.0 | 9.0 | 9.8 |
| $M_w$ (kg/mol) | 333 | 313 | 300 | 328 | 296 | 298 | 344 | 313 | 203 | 218 |
| $M_z$ (kg/mol) | 2165 | 2075 | 1955 | 2126 | 1970 | 1563 | 2008 | 1904 | 932 | 1130 |
| $M_w/M_n$ (=PD) | 44 | 43 | 39 | 37 | 32 | 40 | 46 | 49 | 23 | 22 |

The data, especially the strain hardening modulus and the natural draw ratio, shown in Tables 2 and 3 indicate that the slow crack growth resistance based on the polymer composition of the current inventive examples is remarkably improved compared to the comparative examples. One reason for this may be in high values of the complex viscosity at 0.05 rad/s $Eta_{0.05\ rad/s}$. Also the complex viscosity at 0.05 rad/s $Eta_{0.05\ rad/s}$ of the examples of some prior art are in rather low level as shown in Table 4, which may predict rather modest slow crack growth results compared to the current inventive examples.

Figure 2:
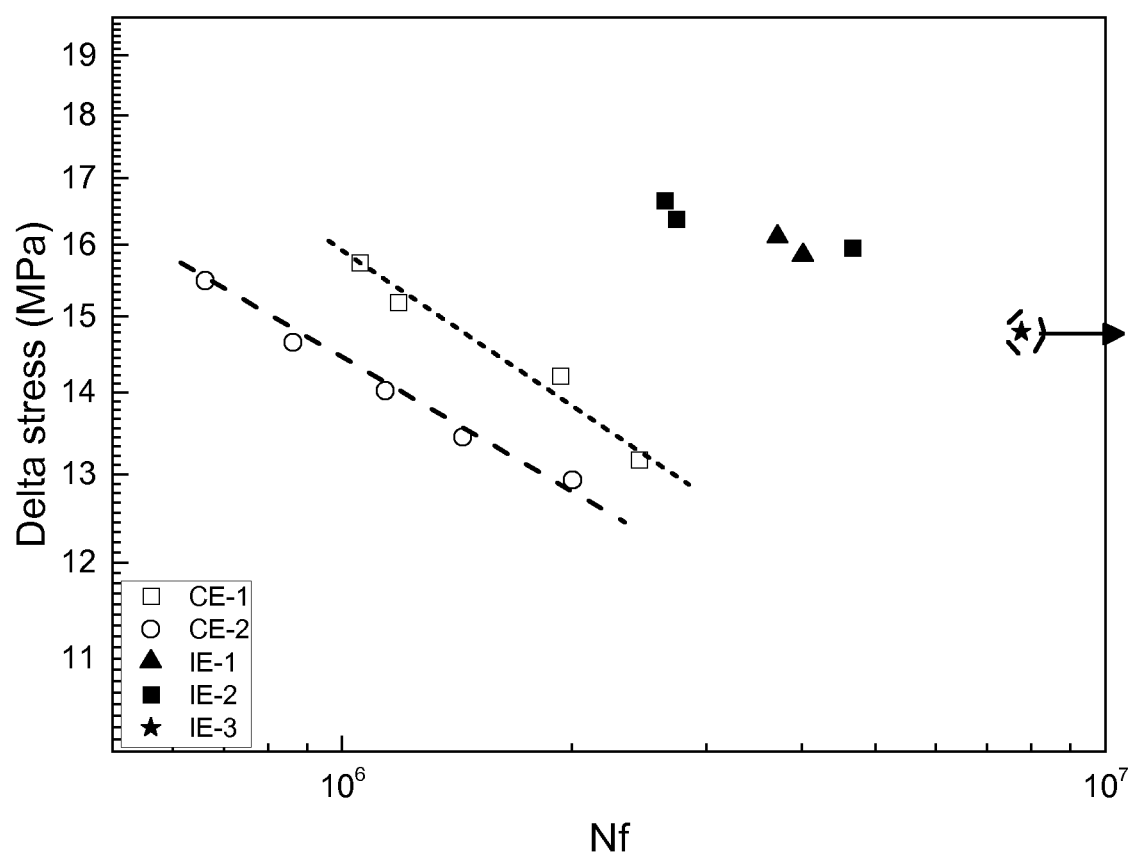
FIG. 2 shows cracked round bar (CRB) results of embodiments in accordance with the invention and comparative examples.

Also FIG. 2 showing cracked round bar (CRB) results of inventive and comparative embodiments indicate a better slow crack growth resistance of the inventive examples, too. The brittle failure times of inventive examples shifted to right hand side when $C_6$ content of the very high molecular weight component is increasing. This may indicate an improved slow crack growth resistance, especially with higher $C_6$ content of the very high molecular weight component. By varying the $C_6$ content of the very high molecular weight component, a good balance between the short term performance and the slow crack growth resistance may be achieved.

Gel Permeation Chromatography (GPC) curves of inventive examples 1-3 and comparative examples 1 and 2 are shown in FIG. 1.

This all means that the compositions of the inventive examples have significant advantages over the ones known in the art.

The written description includes examples of the invention to enable persons skilled in the art to produce and exploit the invention. However, the claims define the scope of protection, which may cover also other examples of the invention. Such examples may have elements that belong to the literal language of the claims or they are equivalent including only minor differences from the literal language of the claims.

The invention claimed is:

1. A polymer composition comprising a base resin which comprises at least three polymer components:
   (a) a very high molecular weight polyethylene component as fraction A1;
   (b) a low molecular weight polyethylene component as fraction A2 having a weight average molecular weight lower than a weight average molecular weight of the very high molecular weight polyethylene component; and
   (c) a high molecular weight polyethylene component as fraction A3 having a weight average molecular weight higher than the weight average molecular weight of the low molecular weight polyethylene component, but lower than the weight average molecular weight of the very high molecular weight component, wherein
   (I) the polymer composition has a complex viscosity at 0.05 rad/s ($Eta_{0.05\ rad/s}$) of equal to or more than 800 kPa·s, a viscosity at a shear stress of 747 Pa (eta747) of equal to or less than 34000 kPa·s and a melt flow rate $MFR_5$ of equal to or less than 0.17 g/10 min.

2. The polymer composition according to claim 1, wherein the polymer composition has a melt flow rate $MFR_{21}$ of equal to or less than 5.9 g/10 min.

3. The polymer composition according to claim 1, wherein the polymer composition has a melt flow rate $MFR_{21}$ of at least 0.5 g/10 min.

4. The polymer composition according to claim 1, wherein the polymer composition has a melt flow rate $MFR_5$ of equal to or less than 0.15 g/10 min.

5. The polymer composition according to claim 1, wherein the polymer composition has a viscosity at a shear stress of 747 Pa (eta747) of 2000 to 34000 kPa·s.

6. The polymer composition according to claim 1, wherein the polymer composition has a viscosity at a shear stress of 747 Pa (eta747) of equal to or less than 30000 kPa·s.

7. The polymer composition according to claim 1, wherein the polymer composition has a complex viscosity at 0.05 rad/s ($Eta_{0.05\ rad/s}$) of equal to or more than 850 kPa·s.

8. The polymer composition according to claim 1, wherein the composition including carbon black has a density of 940 to 975 kg/m$^3$.

9. The polymer composition according to claim 1, wherein
   (i) an amount of the very high molecular weight polyethylene component in the base resin is 2 to 25 wt %, which very high molecular weight polyethylene component is an ethylene homo- or copolymer having at least one C3-C20 alpha olefin comonomer;
   (ii) an amount of the low molecular weight polyethylene component in the base resin is 45 to 70 wt %, which low molecular weight polyethylene component is an ethylene homo- or copolymer with at least one C3-C20 alpha olefin comonomer; and
   (iii) an amount of the high molecular weight polyethylene component in the base resin is 15 to 50 wt %, which high molecular weight polyethylene component is an ethylene copolymer with at least one C3-C20 alpha olefin comonomer.

10. The polymer composition according to claim 1, wherein the very high molecular weight polyethylene component, and the high molecular weight polyethylene component are ethylene copolymers, and the low molecular weight polyethylene component is ethylene homopolymer.

11. An article comprising the polymer composition as defined in claim 1, wherein the article is a pipe or fitting.

12. A method comprising producing an article from a polymer composition comprising a base resin which comprises at least three polymer components:
   (a) a very high molecular weight polyethylene component as fraction A1;
   (b) a low molecular weight polyethylene component as fraction A2 having a weight average molecular weight lower than a weight average molecular weight of the very high molecular weight polyethylene component; and
   (c) a high molecular weight polyethylene component as fraction A3 having a weight average molecular weight higher than the weight average molecular weight of the low molecular weight polyethylene component, but lower than the weight average molecular weight of the very high molecular weight component, wherein
   (I) the polymer composition has a complex viscosity at 0.05 rad/s ($Eta_{0.05\ rad/s}$) of equal to or more than 800 kPa·s, a viscosity at a shear stress of 747 Pa (eta747) of equal to or less than 34000 kPa·s and a melt flow rate $MFR_5$ of equal to or less than 0.17 g/10 min.

13. A process for the production of a polymer composition comprising a base resin which comprises at least three polymer components, which comprises steps of
   (a) polymerizing ethylene and optionally at least one comonomer in the presence of a polymerization catalyst(s) to form a very high molecular weight polyethylene component of fraction A1;
   (b) polymerizing ethylene and optionally at least one comonomer in the presence of same or different polymerization catalyst(s) as polymerizing the very high molecular weight polyethylene component to form a low molecular weight polyethylene component of fraction A2 having a weight average molecular weight lower than a weight average molecular weight of the very high molecular weight polyethylene component; and
   (c) polymerizing ethylene and optionally at least one comonomer in the presence of same or different polymerization catalyst(s) as polymerizing the very high molecular weight polyethylene component to form a high molecular weight polyethylene component of fraction A3 having a weight average molecular weight higher than the weight average molecular weight of the low molecular weight polyethylene component, but lower than the weight average molecular weight of the very high molecular weight component,
wherein
(i) at least one of the polymerization catalyst(s) is a Ziegler-Natta (ZN) catalyst;
(ii) the polymer composition has a complex viscosity at 0.05 rad/s $Eta_{0.05\ rad/s}$ of equal to or more than 800 kPa·s, a viscosity at a shear stress of 747 Pa (eta747) of equal to or less than 34000 kPa·s and a melt flow rate $MFR_5$ of equal to or less than 0.17 g/10 min.

14. The process according to claim 13, wherein the Ziegler-Natta (ZN) catalyst comprises an internal organic compound having the formula (I):

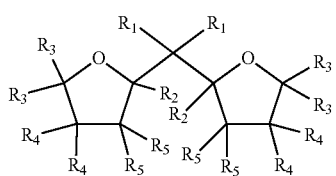
(I)

wherein in the formula (I) $R_1$ to $R_5$ are the same or different and can be hydrogen, a linear or branched C1 to C8-alkyl group, or a C3-C8-alkylene group, or two or more of $R_1$ to $R_5$ can form a ring, and the two oxygen-containing rings are individually saturated or partially unsaturated or unsaturated.

15. The process according to claim 14 comprising additional steps of (a) providing solid carrier particles of $MgCl_2$*mROH adduct; (b) pre-treating the solid carrier particles of step (a) with a compound of Group 13 metal; (c) contacting the solid carrier particles with the internal organic compound having the formula (I); (d) treating pre-treated solid carrier particles of step (c) with a transition metal compound of Group 4 to 6; (e) recovering solid catalyst component; and (f) passing the solid catalyst component into a first polymerization stage, wherein R in the adduct $MgCl_2$*mROH is a linear or branched alkyl group with 1 to 12 carbon atoms and m is a number from 0 to 6.

* * * * *